US010586955B2

(12) United States Patent
Takahashi et al.

(10) Patent No.: US 10,586,955 B2
(45) Date of Patent: Mar. 10, 2020

(54) SECONDARY BATTERY

(71) Applicant: SEMICONDUCTOR ENERGY LABORATORY CO., LTD., Atsugi-shi, Kanagawa-ken (JP)

(72) Inventors: Minoru Takahashi, Nagano (JP); Ryota Tajima, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 0 days.

(21) Appl. No.: 16/382,249

(22) Filed: Apr. 12, 2019

(65) Prior Publication Data

US 2019/0237711 A1 Aug. 1, 2019

Related U.S. Application Data

(63) Continuation of application No. 14/558,781, filed on Dec. 3, 2014, now Pat. No. 10,263,223.

(30) Foreign Application Priority Data

Dec. 4, 2013 (JP) .................................. 2013-251175

(51) Int. Cl.
*H01M 2/02* (2006.01)
*H01M 2/08* (2006.01)
(52) U.S. Cl.
CPC ....... *H01M 2/0275* (2013.01); *H01M 2/0207* (2013.01); *H01M 2/08* (2013.01)
(58) Field of Classification Search
CPC ..... H01M 2/0275; H01M 2/0207; H01M 2/08
See application file for complete search history.

(56) References Cited

U.S. PATENT DOCUMENTS

| | | | |
|---|---|---|---|
| 6,048,646 | A | 4/2000 | Xing et al. |
| 6,376,109 | B1 | 4/2002 | Sano et al. |
| 6,632,538 | B1 | 10/2003 | Yamazaki et al. |

(Continued)

FOREIGN PATENT DOCUMENTS

| | | |
|---|---|---|
| JP | 59-189554 A | 10/1984 |
| JP | 2000-173559 A | 6/2000 |

(Continued)

OTHER PUBLICATIONS

Jung.M et al., "Novel Nanostructured Si anode Behavior on Nanorod Array Polymer Substrate", Prime (Pacific Rim Meeting), Oct. 7, 2012, p. 868, The Electrochemical Society.

*Primary Examiner* — Stephan J Essex
(74) *Attorney, Agent, or Firm* — Nixon Peabody LLP; Jeffrey L. Costellia

(57) ABSTRACT

A secondary battery with an exterior body having a novel sealing structure, and a structure of a sealing portion that relaxes a stress of deformation are provided. The secondary battery includes a positive electrode, a negative electrode, an electrolyte solution, and an exterior body enclosing at least part of the positive electrode, at least part of the negative electrode, and the electrolyte solution. The exterior body includes a first region having a shape with a curve, a shape with a wavy line, a shape with an arc, or a shape with a plurality of inflection points, and a second region having the same shape as the first region. The first region is in contact with the second region. Alternatively, the first region has a shape without a straight line. The secondary battery may be flexible, and the exterior body in a region having flexibility may include the first region.

16 Claims, 24 Drawing Sheets

(56) References Cited

U.S. PATENT DOCUMENTS

| | | |
|---|---|---|
| 7,045,438 B2 | 5/2006 | Yamazaki et al. |
| 8,390,019 B2 | 3/2013 | Yamazaki et al. |
| 8,785,030 B2 | 7/2014 | Ueda |
| 2007/0087269 A1 | 4/2007 | Inda |
| 2010/0239907 A1 | 9/2010 | Izumi |
| 2010/0243050 A1 | 9/2010 | Goldstein |
| 2011/0117417 A1 | 5/2011 | Pitts |
| 2012/0002349 A1 | 1/2012 | Ito et al. |
| 2012/0064402 A1 | 3/2012 | Tsuji et al. |
| 2012/0276434 A1 | 11/2012 | Gaikwad et al. |
| 2012/0308891 A1 | 12/2012 | Todoriki et al. |
| 2013/0134051 A1 | 5/2013 | Takahashi et al. |
| 2013/0224562 A1 | 8/2013 | Momo |
| 2013/0252088 A1 | 9/2013 | Kuriki et al. |
| 2013/0252089 A1 | 9/2013 | Kuriki |
| 2013/0273405 A1 | 10/2013 | Takahashi et al. |
| 2013/0288104 A1 | 10/2013 | Kang et al. |
| 2014/0315091 A1 | 10/2014 | Yamazaki et al. |

FOREIGN PATENT DOCUMENTS

| | | |
|---|---|---|
| JP | 2002-343340 A | 11/2002 |
| JP | 2005-190713 A | 7/2005 |
| JP | 2006-331874 A | 12/2006 |
| JP | 2007-250449 A | 9/2007 |
| JP | 2013-191548 A | 9/2013 |
| JP | 2013-211262 A | 10/2013 |
| WO | WO-2012/140709 | 10/2012 |
| WO | WO-2012/165358 | 12/2012 |
| WO | WO-2013/137693 | 9/2013 |

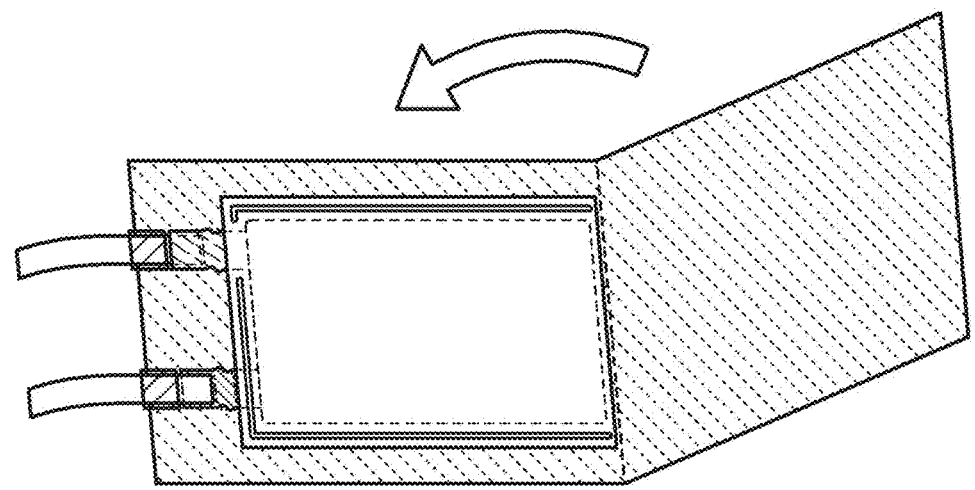
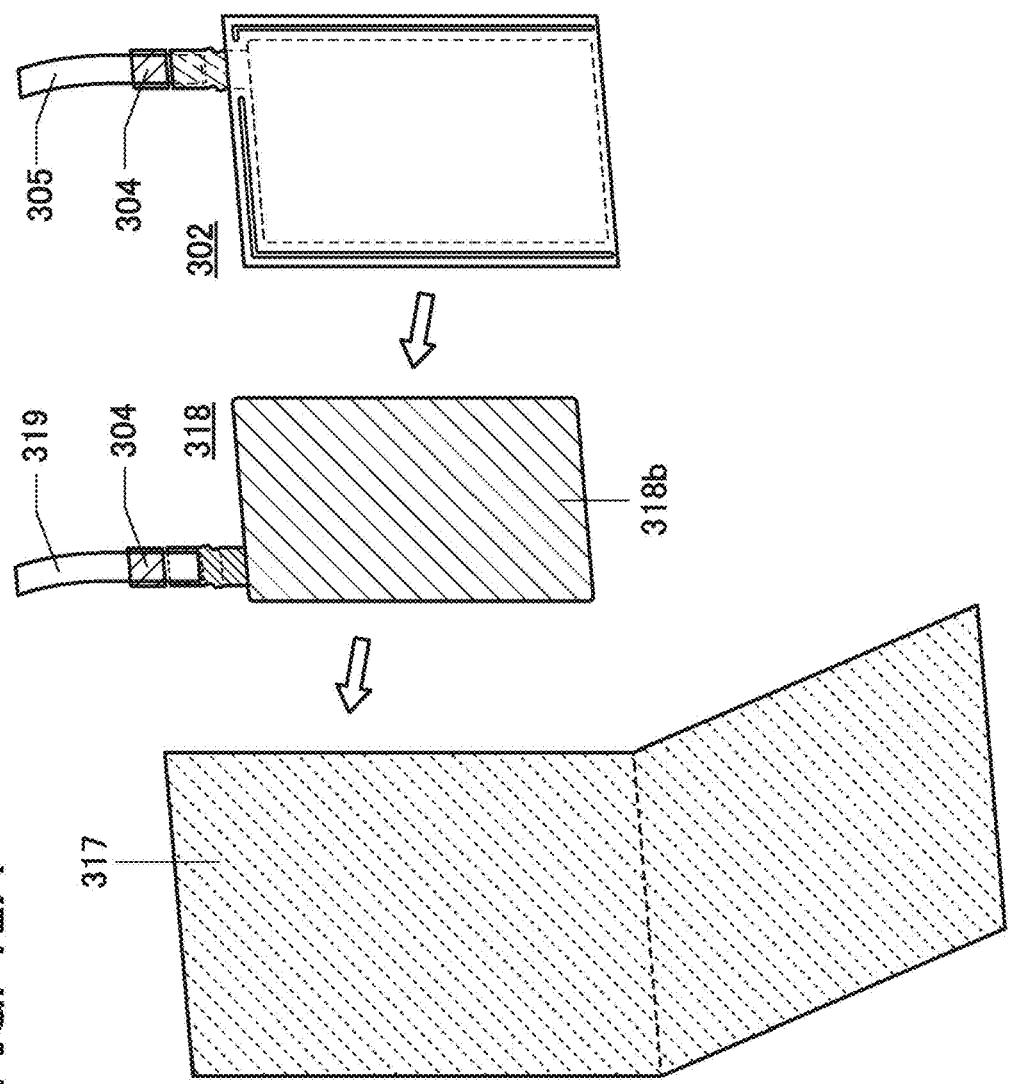
FIG. 12A
FIG. 12B

SECONDARY BATTERY

BACKGROUND OF THE INVENTION

1. Field of the Invention

One embodiment of the present invention relates to a secondary battery.

Note that one embodiment of the present invention is not limited to the above technical field. The technical field of one embodiment of the invention disclosed in this specification and the like relates to an object, a method, or a manufacturing method.

In addition, one embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, a storage device, a method for driving any of them, and a method for manufacturing any of them.

2. Description of the Related Art

In recent years, a variety of power storage devices, for example, secondary batteries such as lithium-ion secondary batteries, lithium-ion capacitors, air batteries, and fuel batteries have been actively developed (Patent Documents 1 to 4). In particular, with the development of the semiconductor industry and with the growing demand for energy saving, the uses of lithium-ion secondary batteries with high output and high energy density have rapidly expand to include, for example, portable information terminals such as cellular phones, smartphones, and laptop personal computers; electric devices such as portable music players and digital cameras; medical equipment; next-generation clean energy vehicles such as hybrid electric vehicles (HEVs), electric vehicles (EVs), and plug-in hybrid electric vehicles (PHEVs); stationary power storage devices; and the like. The lithium-ion secondary batteries are essential for today's information society. Furthermore, with the growing expectations for flexible devices or wearable devices in recent years, development of lithium-ion secondary batteries that have flexibility to be deformed following deformation of devices, i.e., flexible lithium-ion secondary batteries is urgently necessary.

A lithium-ion secondary battery, which is a nonaqueous secondary battery, includes a positive electrode, a negative electrode, a separator, a nonaqueous electrolyte solution, and an exterior body covering these components. In lithium-ion secondary batteries, positive electrodes and negative electrodes are generally used; the positive electrodes each include a positive electrode current collector made of aluminum or the like and a positive electrode mix which includes a positive electrode active material capable of occluding and releasing lithium ions and which is applied to each surface of the positive electrode current collector, and the negative electrodes each include a negative electrode current collector made of copper or the like and a negative electrode mix which includes a negative electrode active material capable of occluding and releasing lithium ions and which is applied to each surface of the negative electrode current collector. These positive and negative electrodes are insulated from each other by a separator provided therebetween, and the positive electrode and the negative electrode are electrically connected to a positive electrode terminal and a negative electrode terminal, respectively, which are provided on the exterior body. The exterior body has a certain shape such as a cylindrical shape or a rectangular shape.

REFERENCES

[Patent Document]

[Patent Document 1] PCT International Publication No. WO2012/165358

[Patent Document 2] United States Patent Application Publication No. 2012/0002349

[Patent Document 3] Japanese Published Patent Application No. 2013-211262

[Patent Document 4] Japanese Published Patent Application No. 2013-191548

SUMMARY OF THE INVENTION

A flexible lithium-ion secondary battery, which is a flat secondary battery, for example, can be obtained when its components such as electrodes, active materials, a separator, and an exterior body are flexible and have a function of being deformed in response to an external force. In addition to general properties such as high capacity and less degradation by repeated charge and discharge that are required for secondary batteries, mechanical strength to endure repeated deformation is an important property required for flexible lithium-ion secondary batteries.

A prototype flexible lithium-ion secondary battery was subjected to a repeated deformation test to find that damages accumulate around a sealing portion at the outer edge of an exterior body that holds components and an electrolyte solution of the battery, as the number of repetitions of deformation increases, which caused breakage of the sealing structure or the exterior body and entry of air into the secondary battery.

In order for a secondary battery to have flexibility, its exterior body also needs to be formed of a material that can be deformed. For the exterior body of a flexible secondary battery, a sheet formed by laminating a polymer film and a metal sheet such as aluminum is used. Electrode current collectors, active materials, a separator and the like are sandwiched by the sheet, and the outer edge of the sheet is sealed by heat fusion bonding or other methods, whereby a flexible secondary battery is formed. Note that the shape of a sealing portion of an exterior body is conventionally linear in consideration of the cost and ease of sealing. Here, a sealing portion of an exterior body refers to a portion where two exterior bodies or two regions of an exterior body are adhered to each other by heat fusion bonding or other methods. Furthermore, unless otherwise specified, the shape of a sealing portion of an exterior body refers to the shape of the sealing portion of the exterior body viewed from directly above the flat surface of the sheet-like exterior body, not the shape of the sealing portion of the exterior body in the cross-section of the secondary battery, in this specification.

In the repeated deformation test of a secondary battery, a stress of deformation is found to concentrate in the sealing portion of the exterior body in a deformed region. In a case where a secondary battery (sandwiched by two exterior bodies) is bent with a certain axis as the center of curvature, for example, a compressive stress is applied to an exterior body closer to the axis because the radius of curvature is relatively small, and a tensile stress is applied to the other exterior body farther from the axis because the radius of curvature is relatively large. The sealing portion near the axis corresponds to a portion where the exterior body subjected to a compressive stress and the exterior body subjected to a tensile stress are bonded to each other.

Since the conventional sealing portion is linear as described above, the concentrated stress of deformation cannot be relaxed. Thus, a burden to the exterior bodies in and around the sealing portion leads to fatigue accumulation, resulting in breakage of the exterior bodies, which causes leakage of the electrolyte solution and entry of air into the secondary battery. Entry of air into the secondary battery is a significant safety problem because it not merely deprives the secondary battery of its functions as a battery, but may cause heat generation and ignition.

Furthermore, breakage of the exterior bodies occurs particularly around the boundary between the sealing portion and the inner portion of the secondary battery. Specifically, flexibility in deformation is relatively low in the sealing portion where two exterior body sheets are adhered to each other by heat fusion bonding or the like, whereas flexibility in deformation is relatively high in the inner portion where the two exterior body sheets are not fixed to each other. The above-mentioned boundary corresponds to the boundary between the two regions with different deformation conditions, and a stress is more likely to concentrate there. Thus, the exterior bodies are likely to be broken there.

In view of the above problems, an object of one embodiment of the present invention is to provide a flexible secondary battery with a structure of a sealing portion that can relax a stress of deformation. Another object is to provide a flexible secondary battery with a sealing structure that can endure change in shape. Another object is to ensure the safety of a flexible secondary battery.

Another object of one embodiment of the present invention is to provide a lithium-ion secondary battery with an exterior body having a novel sealing structure.

Another object of one embodiment of the present invention is to provide a novel secondary battery, a novel power storage device, or the like.

Another object of one embodiment of the present invention is to provide a secondary battery having a function of changing in shape, i.e., a flexible secondary battery.

Note that the descriptions of these objects do not disturb the existence of other objects. In one embodiment of the present invention, there is no need to achieve all the objects. Other objects will be apparent from and can be derived from the description of the specification, the drawings, the claims and the like.

One embodiment of the invention disclosed in this specification is a secondary battery that includes a positive electrode, a negative electrode, an electrolyte solution, and an exterior body that surrounds at least part of the positive electrode, at least part of the negative electrode, and the electrolyte solution. The exterior body includes a first region having a curved shape, a wavy line shape, an arc shape, or a shape with a plurality of inflection points, and a second region having the same shape as the first region. The first region and the second region are in contact with each other.

Another embodiment of the invention disclosed in this specification is a secondary battery that includes a positive electrode, a negative electrode, an electrolyte solution, and an exterior body that encloses at least part of the positive electrode, at least part of the negative electrode, and the electrolyte solution. The exterior body includes a first region having a shape without a straight line and a second region having the same shape as the first region. The first region and the second region are in contact with each other.

Another embodiment of the invention disclosed in this specification is a secondary battery that includes a positive electrode, a negative electrode, an electrolyte solution, and an exterior body that encloses at least part of the positive electrode, at least part of the negative electrode, and the electrolyte solution. The exterior body includes a sealing portion having a shape with a curve, a shape with a wavy line, a shape with an arc, or a shape with a plurality of inflection points.

Another embodiment of the invention disclosed in this specification is a secondary battery that includes a positive electrode, a negative electrode, an electrolyte solution, and an exterior body that encloses at least part of the positive electrode, at least part of the negative electrode, and the electrolyte solution. The exterior body includes a sealing portion having a shape without a straight line.

The secondary battery may be flexible.

Another embodiment of the invention disclosed in this specification is a flexible secondary battery that includes a positive electrode, a negative electrode, an electrolyte solution, and an exterior body that encloses at least part of the positive electrode, at least part of the negative electrode, and the electrolyte solution. The exterior body includes a first region having a shape with a curve, a shape with a wavy line, a shape with an arc, or a shape with a plurality of inflection points, and a second region having the same shape as the first region. The first region and the second region are in contact with each other. The exterior body in a region of the flexible secondary battery, the region having a function of changing in shape, includes the first region.

Another embodiment of the invention disclosed in this specification is a flexible secondary battery that includes a positive electrode, a negative electrode, an electrolyte solution, and an exterior body that encloses at least part of the positive electrode, at least part of the negative electrode, and the electrolyte solution. The exterior body includes a first region having a shape without a straight line and a second region having the same shape as the first region. The first region and the second region are in contact with each other. The exterior body in a region of the flexible secondary battery, the region having a function of changing in shape, includes the first region.

In a flexible secondary battery, a sealing portion 100 of an exterior body 103 has a shape with a curve, a shape with a wavy line, a shape with an arch, or a shape with a plurality of inflection points, instead of a linear shape (see FIGS. 1A and 1B). With such a structure, when a stress of deformation is applied to a portion 101 of the sealing portion of the exterior body 103, the area of the sealing portion, which is subjected to the stress, can be larger than that of a sealing portion having a linear shape (see FIG. 1C). Specifically, when a secondary battery with an exterior body having a linear sealing portion and a secondary battery with an exterior body having a wavy sealing portion are deformed in the same way to be subjected to the same stress, for a comparison purpose, the area subjected to the stress in the wavy sealing portion is larger than that in the linear sealing portion.

Accordingly, the wavy sealing portion can disperse and relax the stress, reducing the intensity of a stress per unit area of the sealing portion of the exterior body. Thus, the secondary battery's resistance to deformation improves, whereby a secondary battery that can endure repeated deformation can be obtained.

In addition, in a case where a sealing portion does not have a linear shape, the area of that sealing portion is larger than a case where a sealing portion with the same width has a linear shape, which leads to stronger sealing. Accordingly, usage of the non-linear sealing portion in a secondary battery that is not flexible also has an advantage of long-term reliability.

Note that two or more of a shape with a curve, a shape with a wavy line, a shape with an arc, and a shape with a plurality of inflection points can be used in combination, or any of these shapes can be combined with a linear shape. A secondary battery that is partly flexible may employ a structure where a sealing portion has a shape with a curve, a shape with a wavy line, a shape with an arc, or a shape with a plurality of inflection points in a region having a function of changing in shape, and has a linear shape in the other region. Partly including the linear shape can save the cost and trouble of the sealing process, while enjoying the effects of one embodiment of the invention.

An exterior body of a flexible secondary battery of one embodiment of the present invention can be deformed with a radius of curvature of 10 mm or more, preferably with a radius of curvature of 30 mm or more. An exterior body of a secondary battery is formed of one or two films. For a secondary battery having a layered structure, a cross section of the battery that is bent is a layered components surrounded by two curves of the film serving as the exterior body.

The radius of curvature of a surface will be described with reference to FIGS. 16A to 16C. In FIG. 16A, on a plane 1701 along which a curved surface 1700 is cut, part of a curve 1702, which is a form of the curved surface, is approximated to an arc of a circle, and the radius of the circle is referred to as a radius 1703 of curvature and the center of the circle is referred to as a center 1704 of curvature. FIG. 16B is a top view of the curved surface 1700. FIG. 16C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

In the case where a secondary battery in which a component 1805 including electrodes and an electrolyte solution is sandwiched between two films serving as exterior bodies is bent, a radius 1802 of curvature of a film 1801 closer to a center 1800 of curvature of the secondary battery is smaller than a radius 1804 of curvature of a film 1803 farther from the center 1800 of curvature (FIG. 17A). When the secondary battery is bent and has an arc-shaped cross section, a compressive stress is applied to a surface of the film on the side closer to the center 1800 of curvature and a tensile stress is applied to a surface of the film on the side farther from the center 1800 of curvature (FIG. 17B). However, by forming a pattern of projections and depressions on surfaces of the exterior bodies, influence of distortion can be reduced to be acceptable even when the compressive stress and the tensile stress are applied. For this reason, the secondary battery can change in shape such that the exterior body on the side closer to the center of curvature has a radius of curvature of 10 mm or more, preferably 30 mm or more.

Note that the cross-sectional shape of the secondary battery is not limited to a simple arc shape, and the cross section can be partially arc-shaped; for example, a shape illustrated in FIG. 17C, a wavy shape illustrated in FIG. 17D, and an S shape can be used. When the curved surface of the secondary battery has a shape with a plurality of centers of curvature, the secondary battery can change in shape such that a curved surface with the smallest radius of curvature among radii of curvature with respect to the plurality of centers of curvature, which is a surface of the exterior body on the side closer to the center of curvature, has a radius of curvature of 10 mm or more, preferably 30 mm or more.

One embodiment of the present invention can provide a flexible secondary battery with a structure of a sealing portion that relaxes a stress of deformation. One embodiment of the present invention can ensure the safety of a flexible secondary battery.

Furthermore, one embodiment of the present invention can provide a lithium-ion secondary battery with an exterior body having a novel sealing structure. One embodiment of the present invention can provide a flexible secondary battery with a sealing structure that can endure change in shape. One embodiment of the present invention can provide a novel secondary battery, a novel power storage device, or the like.

Furthermore, one embodiment of the present invention can provide a secondary battery having a function of changing in shape, i.e., a flexible secondary battery.

Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

In the accompanying drawings:

FIGS. 12A and 12B illustrate a manufacturing process of a secondary battery of one embodiment of the present invention;

DETAILED DESCRIPTION OF THE INVENTION

Figure 1A:
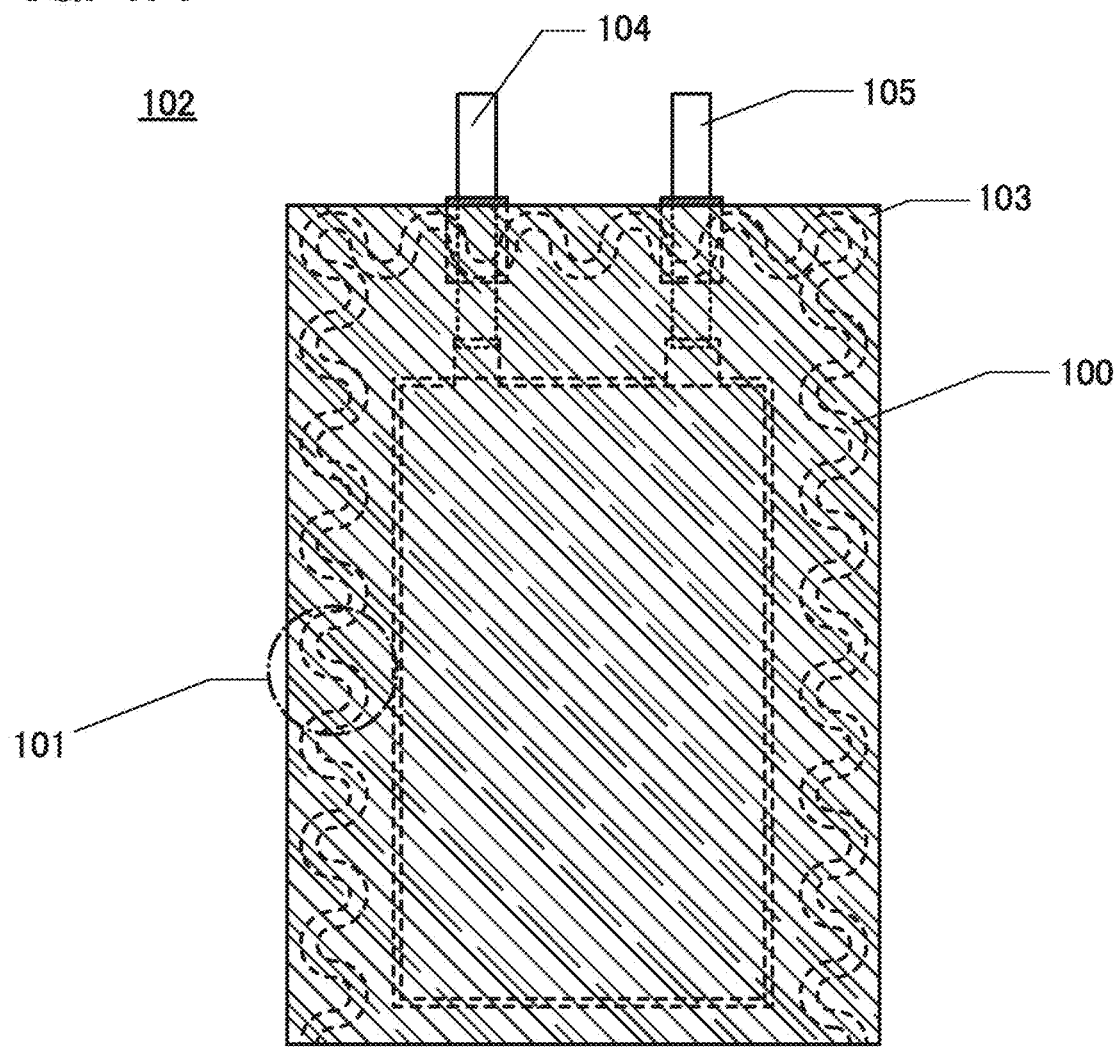
FIGS. 1A to 1C show a secondary battery of one embodiment of the present invention.
Figure 1B:
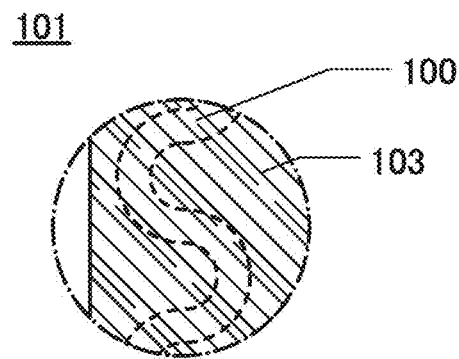
Figure 1C:
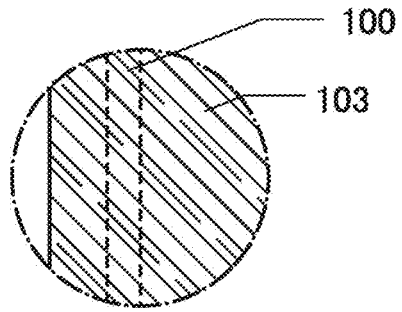

Embodiments of the present invention will be described below in detail with reference to the drawings. However, the present invention is not limited to the description below, and it is easily understood by those skilled in the art that modes and details disclosed herein can be modified in various ways. Further, the present invention is not construed as being limited to description of the embodiments.

Note that in each drawing explained in this specification, the size of each component, such as the thickness and the size of a positive electrode, a negative electrode, an active material layer, a separator, an exterior body, and the like is exaggerated for clarity of explanation in some cases. Therefore, the sizes of the components are not limited to the sizes in the drawings and relative sizes between the components.

Ordinal numbers such as "first", "second", and "third" are used for convenience and do not denote the order of steps or the stacking order of layers. Therefore, for example, description can be made even when "first" is replaced with "second" or "third", as appropriate. In addition, the ordinal numbers in this specification and the like are not necessarily the same as those which specify one embodiment of the present invention.

Note that in the structures of the present invention described in this specification and the like, the same portions or portions having similar functions in different drawings are denoted by the same reference numerals, and description of such portions is not repeated. Further, the same hatching pattern is applied to portions having similar functions, and the portions are not especially denoted by reference numerals in some cases.

In this specification, flexibility refers to a property of an object being flexible and bendable. In other words, it is a property of an object that can be deformed in response to an external force applied to the object, and elasticity or restorability to the former shape is not taken into consideration. A secondary battery having flexibility, i.e. a flexible secondary battery can be deformed in response to an external force. A flexible secondary battery can be used with its shape fixed in a state of being deformed, can be used while repeatedly deformed, and can be used in a state of not deformed.

The descriptions in embodiments of the present invention can be combined with each other as appropriate.

Embodiment 1

Figure 2:
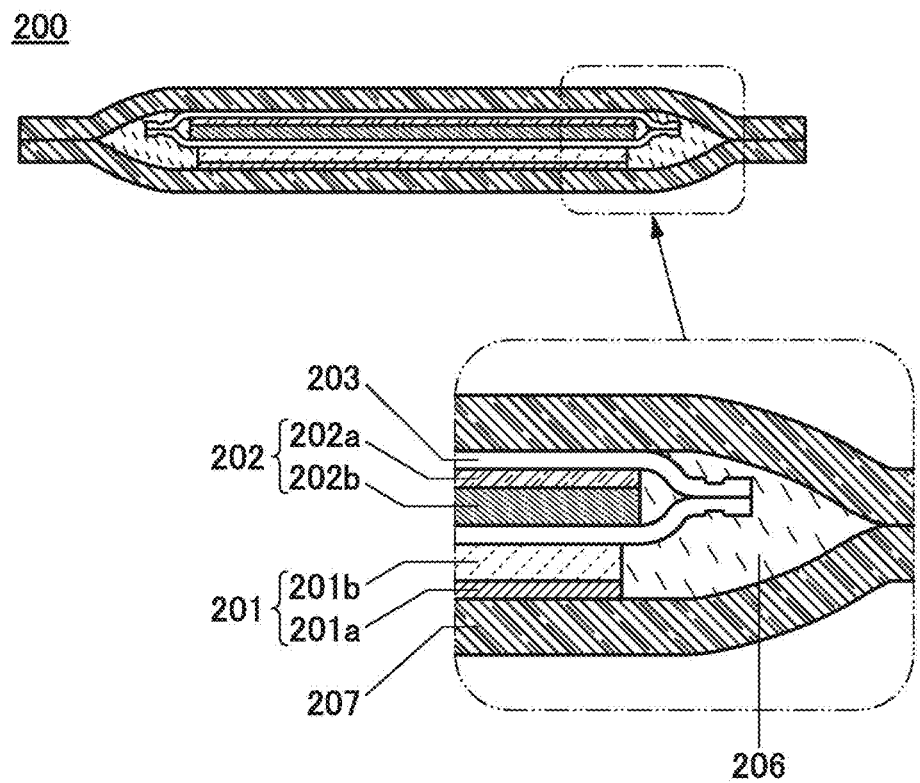
FIG. 2 shows a secondary battery of one embodiment of the present invention.

A manufacturing method of a lithium-ion secondary battery of one embodiment of the present invention will be described below with reference to FIG. 2. FIG. 2 is a cross-sectional schematic view of a stack including a positive electrode current collector 201a, a positive electrode active material layer 201b, a separator 203, a negative electrode active material layer 202b, and a negative electrode current collector 202a. Details of the current collectors and active material layers will be described later. Note that the active material layer can be formed on each surface of the current collector, in which case a secondary battery with a layered structure can be obtained.

Figure 3A:
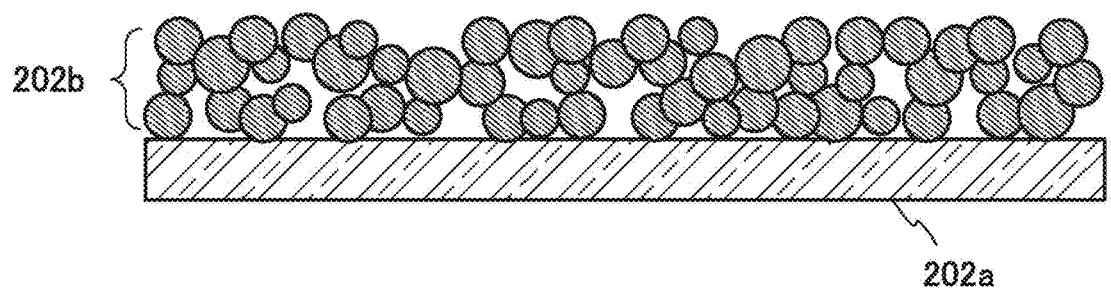
FIGS. 3A and 3B each show a current collector and an active material layer.

A negative electrode will be described with reference to FIG. 3A. The negative electrode includes at least the negative electrode active material layer 202b and the negative electrode current collector 202a. In this embodiment, steps of forming a negative electrode with the use of a carbon-based material as a material of the negative electrode active material layer 202b will be described below. The negative electrode active material is a granular active material in FIG. 3A. For this reason, the negative electrode active material is schematically shown as circles in FIG. 3A; however, the shape of the negative electrode active material is not limited to this shape. In addition, although the negative electrode active material is schematically shown as grains with only several sizes, the sizes may have more variations. Steps of forming the negative electrode will be described below.

For the negative electrode active material, a carbon-based material such as graphite, graphitizing carbon (soft carbon), non-graphitizing carbon (hard carbon), a carbon nanotube, graphene, or carbon black can be used. Examples of the graphite include artificial graphite such as meso-carbon microbeads (MCMB), coke-based artificial graphite, or pitch-based artificial graphite and natural graphite such as spherical natural graphite. In addition, the shape of the graphite is a flaky shape or a spherical shape, for example.

In addition to the carbon-based materials, a material that enables charge-discharge reactions by an alloying reaction and a dealloying reaction with lithium can be used for the negative electrode active material. For example, a material including at least one of Ga, Si, Al, Ge, Sn, Pb, Sb, Bi, Ag, Zn, Cd, In, and the like can be used. Such elements have higher capacity than carbon. In particular, silicon is preferred because it has a high theoretical capacity of 4200 mAh/g. Examples of the alloy-based material using such elements include $Mg_2Si$, $Mg_2Ge$, $SnO$, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, $SbSn$, and the like.

Alternatively, for the negative electrode active material, an oxide such as silicon oxide (SiO), titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M is Co, Ni, or Cu) with a $Li_3N$ structure, which is a nitride including lithium and a transition metal, can be used. For example, $Li_{2.6}Co_{0.4}N_3$ is preferable because of high charge and discharge capacity (900 mAh/g and 1890 mAh/cm$^3$).

When a nitride including lithium and a transition metal is used, lithium ions are included in the negative electrode active material; thus, the negative electrode active material can be used in combination with a material for a positive electrode active material that does not include lithium ions, such as $V_2O_5$ or $Cr_3O_8$. In the case where a material containing lithium ions is used as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FcF_3$ and $BiF_3$.

The negative electrode active material with a particle size of greater than or equal to 50 nm and less than or equal to 100 μm, for example, may be used.

Examples of a conductive additive of an electrode include acetylene black (AB), graphite (black lead) particles, carbon nanotubes, graphene, and fullerene.

A network for electrical conduction can be formed in the electrode by the conductive additive. The conductive additive also allows maintaining of a path for electrical conduction between the negative electrode active materials. The addition of the conductive additive to the negative electrode active material layer increases the electrical conductivity of the negative electrode active material layer 202b.

A typical example of the binder is poly vinylidene fluoride (PVDF), and other examples of the binder include polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose.

The content of the binder in the negative electrode active material layer 202b is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the negative electrode active material layer 202b is preferably greater than or equal to 1 wt % and less than or equal to 10 wt %, more preferably greater than or equal to 1 wt % and less than or equal to 5 wt %.

Next, the negative electrode active material layer 202b is formed on the negative electrode current collector 202a. In the case where the negative electrode active material layer 202b is formed by a coating method, the negative electrode active material, the binder, the conductive additive, and a dispersant are mixed to form an electrode paste (slurry), the electrode paste is applied to the negative electrode current collector 202a, and evaporation is performed. Then, pressing may be performed, if necessary.

In this embodiment, copper foil is used as the negative electrode current collector 202a, and a mixture of MCMB and PVDF as the binder is used as the slurry.

The negative electrode current collector 202a can be formed using a material, which has high conductivity and is not alloyed with carrier ions such as lithium ions, e.g., a metal typified by stainless steel, gold, platinum, zinc, iron, copper, titanium, or tantalum, or an alloy thereof. Alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 202a can have a foil-like shape, a plate-like shape (sheet-like shape), a net-like shape, a cylindrical shape, a coil shape, a punching-metal shape, an expanded-metal shape, or the like as appropriate. The negative electrode current collector 202a preferably has a thickness greater than or equal to 5 μm and less than or equal to 30 μm. Part of the surface of the electrode current collector may be provided with an undercoat layer using graphite or the like.

Through the above steps, the negative electrode of the lithium-ion secondary battery can be formed.

Figure 3B:
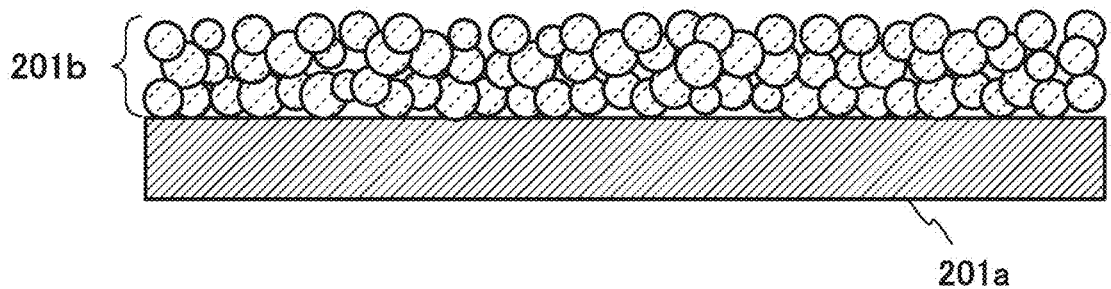

A positive electrode will be described with reference to FIG. 3B. The positive electrode includes at least the positive electrode active material layer 201b and the positive electrode current collector 201a. Although the positive electrode active material is schematically illustrated as circles in FIG. 3B, the shape of the positive electrode active material is not limited to this shape. In addition, although the positive electrode active material is schematically shown as grains with only several sizes, the sizes may have more variations.

The positive electrode 201 includes, for example, the positive electrode current collector 201a and the positive electrode active material layer 201b formed over the positive electrode current collector 201a. In this embodiment, an example of providing the positive electrode active material layer 201b on one surface of the positive electrode current collector 201a having a sheet shape (or a strip-like shape) is shown. However, this embodiment is not limited thereto; the positive electrode active material layer 201b may be provided on each surface of the positive electrode current collector 201a. The positive electrode active material layers 201b may be provided to sandwich the positive electrode current collector 201a therebetween, in which case the capacity of the secondary battery can be increased. Furthermore, in this embodiment, the positive electrode active material layer 201b is provided on the entire positive electrode current collector 201a. However, this embodiment is not limited thereto; the positive electrode active material layer 201b may be provided on part of the positive electrode current collector 201a. For example, the positive electrode active material layer 201b is not provided on a portion of the positive electrode current collector 201a which is to be electrically in contact with a positive electrode lead (hereinafter, the portion is also referred to as a "positive electrode tab").

For the positive electrode active material, for example, a material into and from which carrier ions such as lithium ions can be inserted and extracted can be used. For example, a lithium-containing material with an olivine crystal structure, a layered rock-salt crystal structure, and a spinel crystal structure can be used.

Typical examples of the lithium-containing material with an olivine crystal structure represented by a general formula, $LiMPO_4$ (M is Fe(II), Mn(II), Co(II), or Ni(II)), are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b \le 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e \le 1$, $0<c<1$, $0<d<1$, and $0<e<1$), and $LiFe_fNi_gCo_hMn_iPO_4$ ($f+g+h+i \le 1$, $0<f<1$, $0<g<1$, $0<h<1$, and $0<i<1$).

Lithium iron phosphate ($LiFePO_4$) is particularly preferable because it properly has properties necessary for a positive electrode active material, such as safety, stability, high capacity density, high potential, and the existence of lithium ions that can be extracted in initial oxidation (charge).

Examples of the lithium-containing material with a layered rock-salt crystal structure include lithium cobalt oxide ($LiCoO_2$); $LiNiO_2$; $LiMnO_2$; $Li_2MnO_3$; an NiCo-based lithium-containing material (a general formula thereof is LiNi$_x$Co$_{1+x}$O$_2$ (0<x<1)) such as LiNi$_{0.8}$Co$_{0.2}$O$_2$; an NiMn-based lithium-containing material (a general formula thereof is LiNi$_x$Mn$_{1+x}$O$_2$ (0<x<1)) such as LiNi$_{0.5}$Mn$_{0.5}$O$_2$; and an NiMnCo-based lithium-containing material (also referred to as NMC, and a general formula thereof is LiNi$_x$Mn$_y$Co$_{1-x-y}$O$_2$ (x>0, y>0, x+y<1)) such as LiNi$_{1/3}$Mn$_{1/3}$Co$_{1/3}$O$_2$. Moreover, Li(Ni$_{0.8}$Co$_{0.15}$Al$_{0.05}$)O$_2$, Li$_2$MnO$_3$—LiMO$_2$ (M is Co, Ni, or Mn), and the like can be given as the examples.

LiCoO$_2$ is particularly preferable because it has high capacity, stability in the air higher than that of LiNiO$_2$, and thermal stability higher than that of LiNiO$_2$, for example.

Examples of the lithium-containing material with a spinel crystal structure include LiMn$_2$O$_4$, Li$_{1+x}$Mn$_{2-x}$O$_4$, LiMnAlO$_4$, and LiMn$_{1.5}$Ni$_{0.5}$O$_4$.

It is preferable to add a small amount of lithium nickel oxide (LiNiO$_2$ or LiNi$_{1+x}$MO$_2$ (M=Co, Al, or the like)) to the lithium-containing material with a spinel crystal structure that contains manganese such as LiMn$_2$O$_4$, in which case the elution of manganese and the decomposition of an electrolyte solution can be suppressed, for example.

Alternatively, a composite oxide represented by a general formula, Li$_{(2-j)}$MSiO$_4$ (M is Fe(II), Mn(II), Co(II), or Ni(II), where 0≤j≤2), can be used as the positive electrode active material. Typical examples of Li$_{(2-j)}$MSiO$_4$ (general formula) are Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a nasicon compound represented by a general formula, A$_x$M$_2$(XO$_4$)$_3$ (A is Li, Na, or Mg, M is Fe, Mn, Ti, V, Nb, or Al, and X is S, P, Mo, W, As, or Si), can be used as the positive electrode active material. Examples of the nasicon compound are Fe$_2$(MnO$_4$)$_3$, Fe$_2$(SO$_4$)$_3$, and Li$_3$Fe$_2$(PO$_4$)$_3$. Further alternatively, a compound represented by a general formula Li$_2$MPO$_4$F, Li$_2$MP$_2$O$_7$, and Li$_5$MO$_4$ (M is Fe or Mn), a perovskite fluoride such as NaF$_3$ and FeF$_3$, a metal chalcogenide (a sulfide, a selenide, or a telluride) such as TiS$_2$ and MoS$_2$, a lithium-containing material with an inverse spinel crystal structure such as LiMVO$_4$, a vanadium oxide (V$_2$O$_5$, V$_6$O$_{13}$, LiV$_3$O$_8$, or the like), a manganese oxide, an organic sulfur compound, or the like can be used as the positive electrode active material.

In the case where carrier ions are alkali metal ions other than lithium ions or alkaline-earth metal ions, the following may be used as the positive electrode active material: a compound or oxide which is obtained by substituting an alkali metal (e.g., sodium or potassium) or an alkaline-earth metal (e.g., calcium, strontium, barium, beryllium, or magnesium) for lithium in any of the above-described compounds or oxides. For example, the positive electrode active material may be a layered oxide containing sodium such as NaFeO$_2$ and Na$_{2/3}$[Fe$_{1/2}$Mn$_{1/2}$]O$_2$.

Furthermore, any of the aforementioned materials may be combined to be used as the positive electrode active material. For example, a solid solution obtained by combining two or more of the above materials can be used as the positive electrode active material. For example, a solid solution of LiCo$_{1/3}$Mn$_{1/3}$Ni$_{1/3}$O$_2$ and Li$_2$MnO$_3$ can be used as the positive electrode active material.

The positive electrode active material with a particle size of greater than or equal to 50 nm and less than or equal to 100 μm, for example, may be used.

The separator will be described below. As a material for the separator, paper, nonwoven fabric, a glass fiber, a synthetic fiber such as nylon (polyimide), vinylon (a polyvinyl alcohol based fiber), polyester, acrylic, polyolefin, or polyurethane, or the like may be used. However, a material which does not dissolve in an electrolyte solution described later should be selected.

More specifically, as a material for the separator, high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, nonwoven fabric, and a glass fiber can be used either alone or in combination.

The separator needs to have insulation performance that prevents connection between the electrodes, performance that holds the electrolyte solution, and ionic conductivity. As a method for forming a film having a function as a separator, a method for forming a film by stretching is given. Examples of the method include a stretching aperture method in which a melted polymer material is spread, heat is released from the material, and pores are formed by stretching the resulting film in the directions of two axes parallel to the film.

To set the separator in a secondary battery, a method in which the separator is inserted between a positive electrode and a negative electrode can be used. Furthermore, a method in which the separator is placed on one of the positive electrode and the negative electrode and then the other of the positive electrode and the negative electrode is placed thereon can be used. The positive electrode, the negative electrode, and the separator are stored in an exterior body, and the exterior body is filled with an electrolyte solution, whereby a secondary battery can be formed.

The separator with a size large enough to cover each surface of either the positive electrode or the negative electrode, in a form of sheet or envelope may be fabricated to form the electrode wrapped in the separator. In that case, the electrode can be protected from mechanical damages in the manufacture of the secondary battery and the handling of the electrode becomes easier. The electrode wrapped in the separator and the other electrode are stored in the exterior body, and the exterior body is filled with an electrolyte solution, whereby a secondary battery can be formed. FIG. 2 is a cross-sectional view of a secondary battery with an envelope-like separator. Although FIG. 2 shows the cross-sectional structure of the secondary battery including a pair of positive and negative electrodes, a secondary battery with a layered structure including plural pairs of positive and negative electrodes may also be manufactured.

Furthermore, a plurality of separators may be used. Although the separator can be formed by the above method, the size of pores and the thickness of the film are limited due to the constituent material and the mechanical strength of the film. A first separator and a second separator each formed by a stretching method may be used together in a secondary battery. As the materials for forming the first separator and the second separator, one or more materials can be selected from the above-listed materials or the other materials. Depending on the conditions of film formation, the conditions of film stretching, and the like, properties such as the size of pores in the film, the proportion of the volume occupied by pores (also referred to as porosity), and the film thickness can each be determined. The use of the first separator and the second separator having different properties together increases the variety of properties of the separator for a secondary battery to choose from, as compared to the use of a single separator by itself.

Furthermore, when a secondary battery is subjected to a deforming stress, the stress can be relaxed by sliding of the first separator and the second separator at the interface between the two separators. Therefore, the structure using two separators is suitable for a flexible secondary battery as well.

The electrolyte solution used in the lithium-ion secondary battery is preferably a nonaqueous solution (solvent) containing a supporting electrolyte salt (solute).

As a solvent for the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolyte, safety against liquid leakage and the like is improved. Further, the lithium-ion secondary battery can be thinner and more lightweight. Typical examples of the gelled high-molecular material include a silicone gel, an acrylic gel, an acrylonitrile gel, polyethylene oxide, polypropylene oxide, a fluorine-based polymer, and the like.

Alternatively, the use of one or more of ionic liquids (room temperature molten salts) that have non-flammability and non-volatility as the solvent for the electrolyte solution can prevent a lithium-ion secondary battery from exploding or catching fire even when the lithium-ion secondary battery internally shorts out or the internal temperature increases due to overcharging and the like. Thus, the lithium-ion secondary battery has improved safety.

Examples of a supporting electrolyte salt dissolved in the above-described solvent are one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$, or two or more of these lithium salts in an appropriate combination in an appropriate ratio.

Although the case where carrier ions are lithium ions in the above electrolyte is described, carrier ions other than lithium ions can be used. When carrier ions other than lithium ions are alkali metal ions or alkaline-earth metal ions, instead of lithium in the above lithium salts, an alkali metal (e.g., sodium and potassium), an alkaline-earth metal (e.g., calcium, strontium, barium, beryllium, and magnesium) may be used for an electrolyte.

The electrolyte solution used for the secondary battery preferably contains a reduced amount of dust particles and elements other than the constituent elements of the electrolyte solution (hereinafter, also simply referred to as impurities) so as to be highly purified. Specifically, the weight ratio of impurities to the electrolyte solution is less than or equal to 1%, preferably less than or equal to 0.1%, and more preferably less than or equal to 0.01%. An additive agent such as vinylene carbonate may be added to the electrolyte solution.

Next, an exterior body according to one embodiment of the present invention will be described. As the exterior body, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of an electrolyte solution and a gas can be blocked and an insulating property and resistance to the electrolyte solution can be obtained. The exterior body is folded inside in two, or two exterior bodies are stacked with the inner surfaces facing each other. By the application of heat, the materials on the overlapping inner surfaces melt to cause fusion bonding between the two exterior bodies. In this manner, a sealing structure can be formed.

In a secondary battery of one embodiment of the present invention, a portion where a sealing structure is formed by fusion bonding or the like of the exterior body is referred to as a sealing portion. In a case where the exterior body is folded inside in two, the sealing portion is formed in the place other than the fold, and a first region of the exterior body and a second region of the exterior body that overlaps with the first region are fusion-bonded, for example. In a case where two exterior bodies are stacked, the sealing portion is formed along the entire circumference by heat fusion bonding or the like.

Figure 4A:
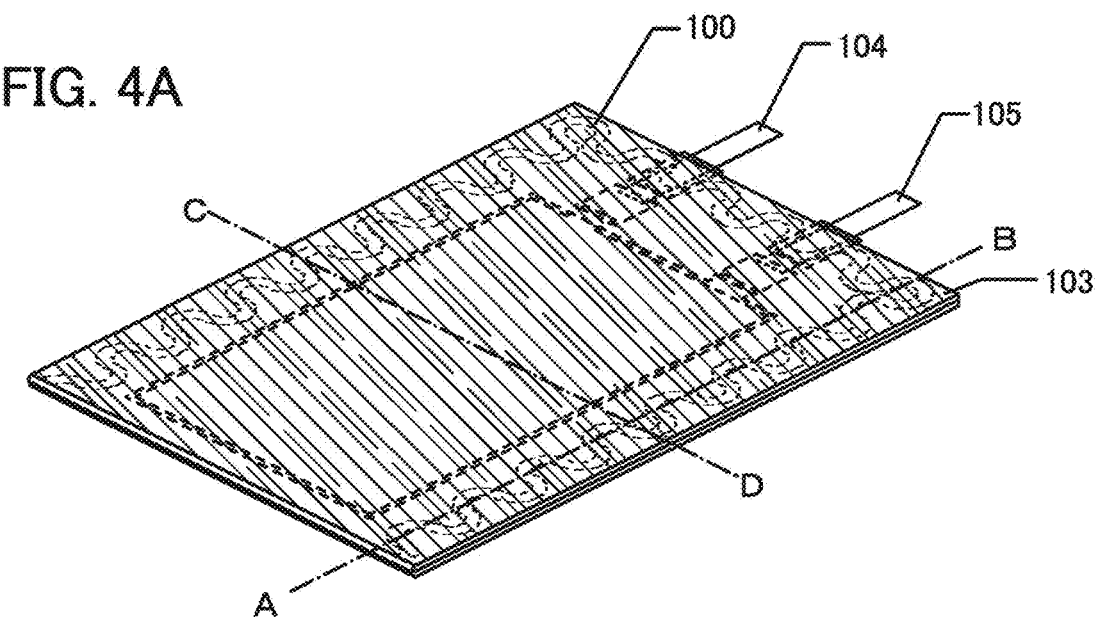
FIGS. 4A to 4D show a secondary battery of one embodiment of the present invention.

In a secondary battery of one embodiment of the present invention, the planar shape of a sealing portion of an exterior body may be a shape with a curve, a shape with a wavy line, a shape with an arc, or a shape with a plurality of inflection points. FIG. 4A shows an example of a secondary battery with a wavy sealing portion. For the secondary battery in FIG. 4A, one exterior body is folded in two and the wavy sealing portion is formed in the place other than the fold.

Although a wavy sealing portion requires a devised manufacturing method because its shape is more complicated than a linear sealing portion, its total length is larger than that of a linear sealing portion. Thus, comparing a wavy sealing portion and a linear sealing portion having the same width, the area used for sealing is larger in the wavy sealing portion than that in the linear sealing portion. Therefore, adhesion of the exterior body is better in the wavy sealing portion.

Figure 4B:
Figure 4C:

The cross-sectional structure of an exterior body of one embodiment of the present invention and the cross-sectional structure of the exterior body when it is deformed will be described with reference to FIGS. 4B to 4D. FIG. 4B schematically shows the cross-sectional structure along dashed line A-B in FIG. 4A. When the secondary battery is deformed in the manner shown in FIG. 4C, a compressive stress is applied to the exterior body closer to the axis of deformation and a tensile stress is applied to the other exterior body farther from the axis. The sealing portion is where the two different stresses join. That is, the sealing portion is subjected to a large burden of deformation, and repeated deformation leads to fatigue accumulation there. Since the wavy sealing portion has better adhesion than the linear sealing portion and is not easily broken by stresses, it is suitable for the sealing structure of a secondary battery with high durability.

Figure 4D:
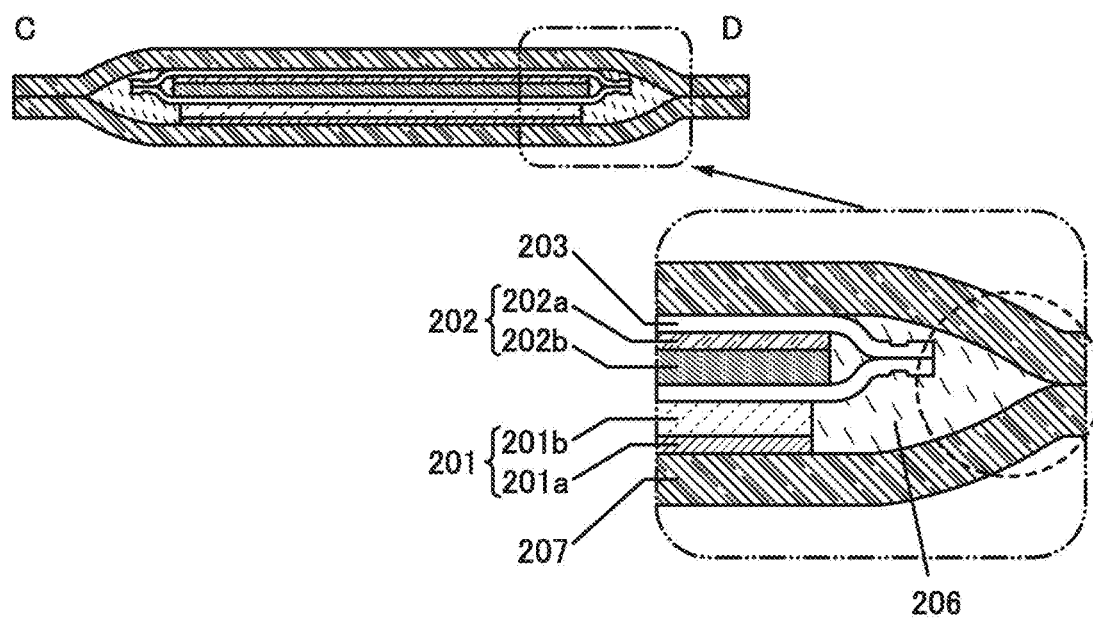

FIG. 4D schematically shows the cross-sectional structure along dashed line C-D in FIG. 4A. Shown in FIG. 4D are a pair of positive and negative electrodes, a separator, an electrolyte solution, and the like sandwiched by exterior bodies; however, a secondary battery of one embodiment of the present invention may be a secondary battery with a layered structure including a plurality of positive electrodes, negative electrodes, and separators being stacked. A sealing portion is at each side of the secondary battery in FIG. 4D. The upper and lower exterior bodies are bonded to each other by fusion bonding or the like to hold the electrolyte solution. The upper and lower exterior bodies are fixed to each other in the sealing portions but the exterior bodies are not fixed in the other portion at the inner side than the sealing portions. The exterior body near the sealing portion corresponds to the boundary between two regions with different deformation conditions, and a stress is more likely to concentrate there.

The above-mentioned boundary between the two regions, which is formed along a sealing portion, can be longer in a wavy sealing portion than in a linear sealing portion. Therefore, for the wavy sealing portion, when a certain stress is applied due to deformation of the secondary battery, the stress can be dispersed in a larger region and the exterior body near the sealing portion is less likely to be broken. Accordingly, the wavy sealing portion is suitable for the sealing structure of a secondary battery with high durability.

Figure 18:
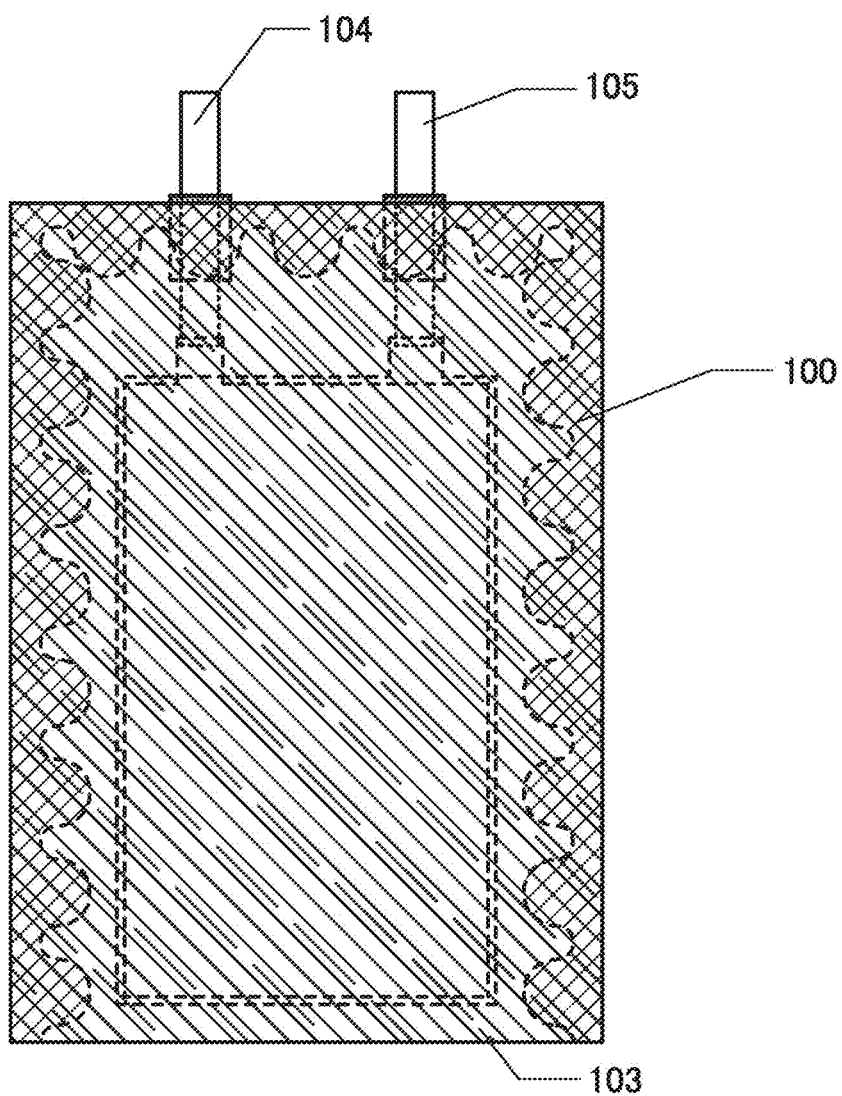
FIG. 18 shows a secondary battery of one embodiment of the present invention.

Note that as a structure for dispersing widely the stress applied to the above-mentioned boundary in a secondary battery, it is acceptable as long as the sealing portion at the inner side of the secondary battery has a wavy shape, and the sealing portion at the outer edge side of the secondary battery may have a different shape. Furthermore, as long as the sealing portion at the inner side of the secondary battery has a wavy shape, the shape of the sealing portion at the outer edge side of the secondary battery may be the same as the planar shape of the exterior body. In other words, the exterior bodies may be pressure-bonded or fusion-bonded at the entire portion at the outer side of the wavy line or the like. FIG. 18 shows an example in which a sealing portion has a shape with a wavy line at the inner side of a secondary battery and has the same shape as the planar shape of an exterior body at the outer edge side of the secondary battery. Note that in FIG. 18 the sealing portion 100 is hatched for the convenience of explanation.

Although the wavy sealing portion, and the shape of the sealing portion at the inner side of the battery with a wavy line are described above, the shape is not limited to a shape with a wavy line, and may be a shape with a curve, a shape with an arch, or a shape with a plurality of inflection points. As long as a sealing portion with the total length larger than that of a linear sealing portion can be formed, the sealing portion may be formed with a variety of shapes without limited to a shape with a wavy line or a shape with an arch. In such a way, a highly reliable secondary battery that can endure repeated deformation can be provided.

Figure 5:
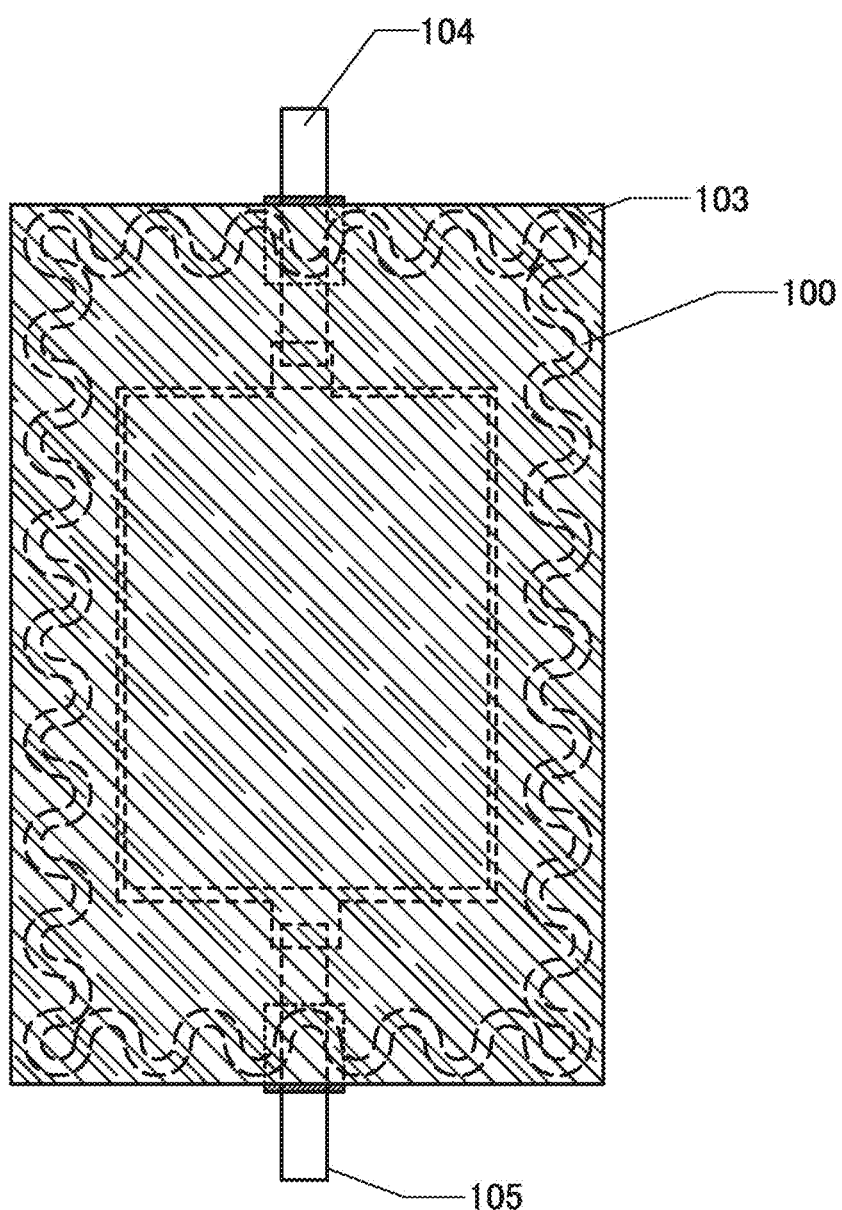
FIG. 5 shows a secondary battery of one embodiment of the present invention.
Figure 6:
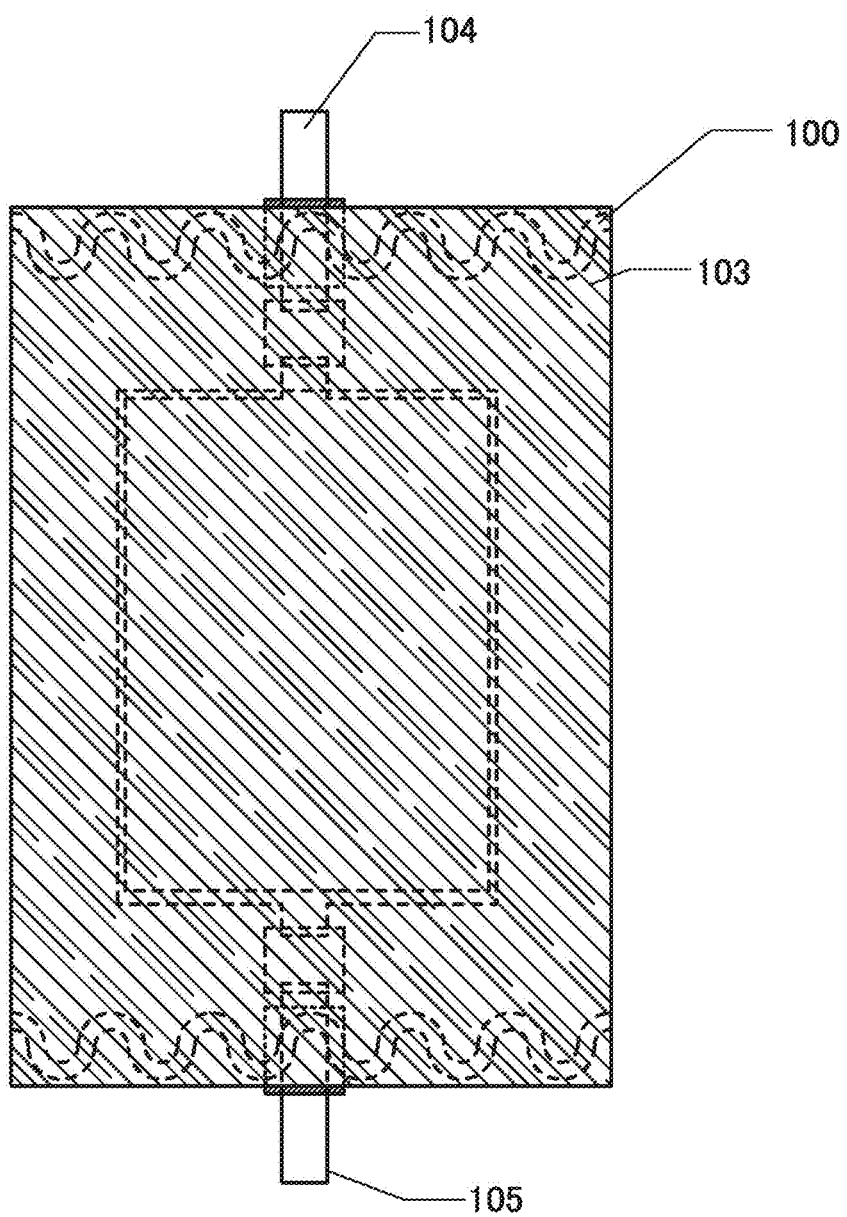
FIG. 6 shows a secondary battery of one embodiment of the present invention.

For example, in a case where an exterior body is formed by fusion-bonding two films that are stacked on one another, a wavy sealing portion can be formed along the entire circumference as shown in FIG. 5. Alternatively, a secondary battery may be fabricated in the following way: an electrode body including a positive electrode, a negative electrode, a separator, and the like is stored in a cylinder formed of a film of an exterior body material, and wavy sealing portions are formed (see FIG. 6). In addition to the wavy sealing portion, a zigzag sealing portion shown in FIG. 7 or a sealing portion having the shape shown in FIG. 8 may be employed.

Figure 7:
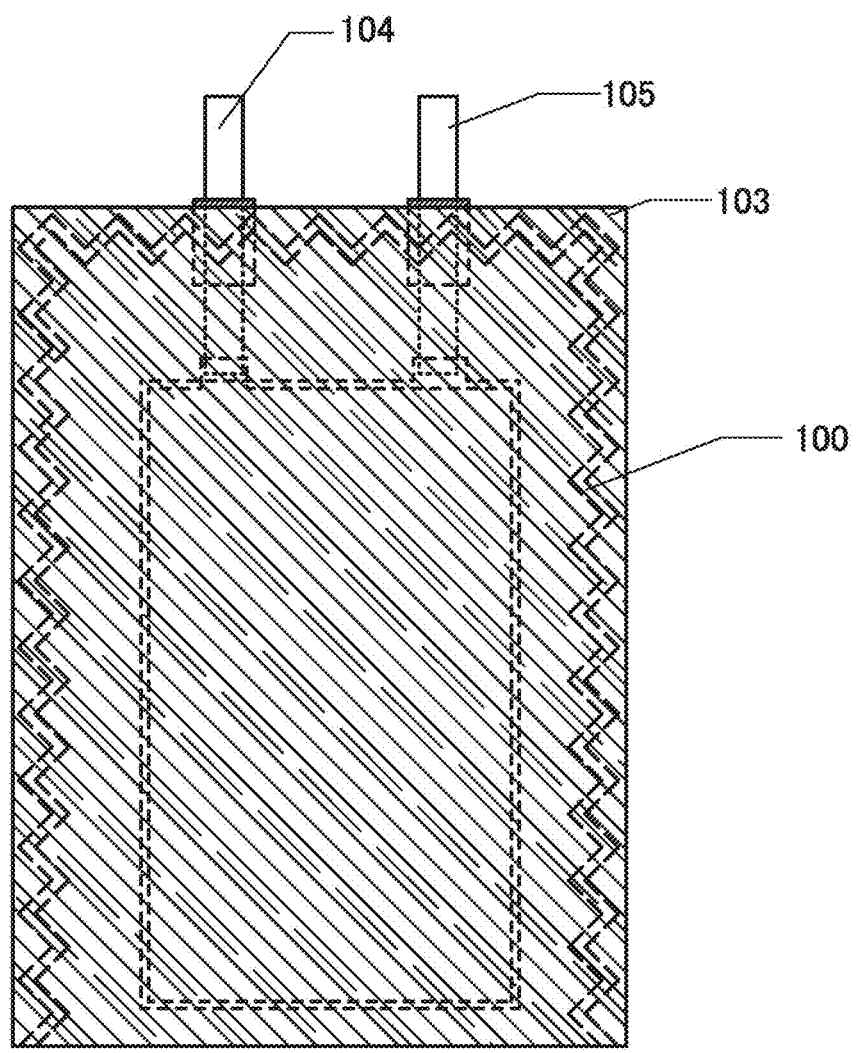
FIG. 7 shows a secondary battery of one embodiment of the present invention.
Figure 8:
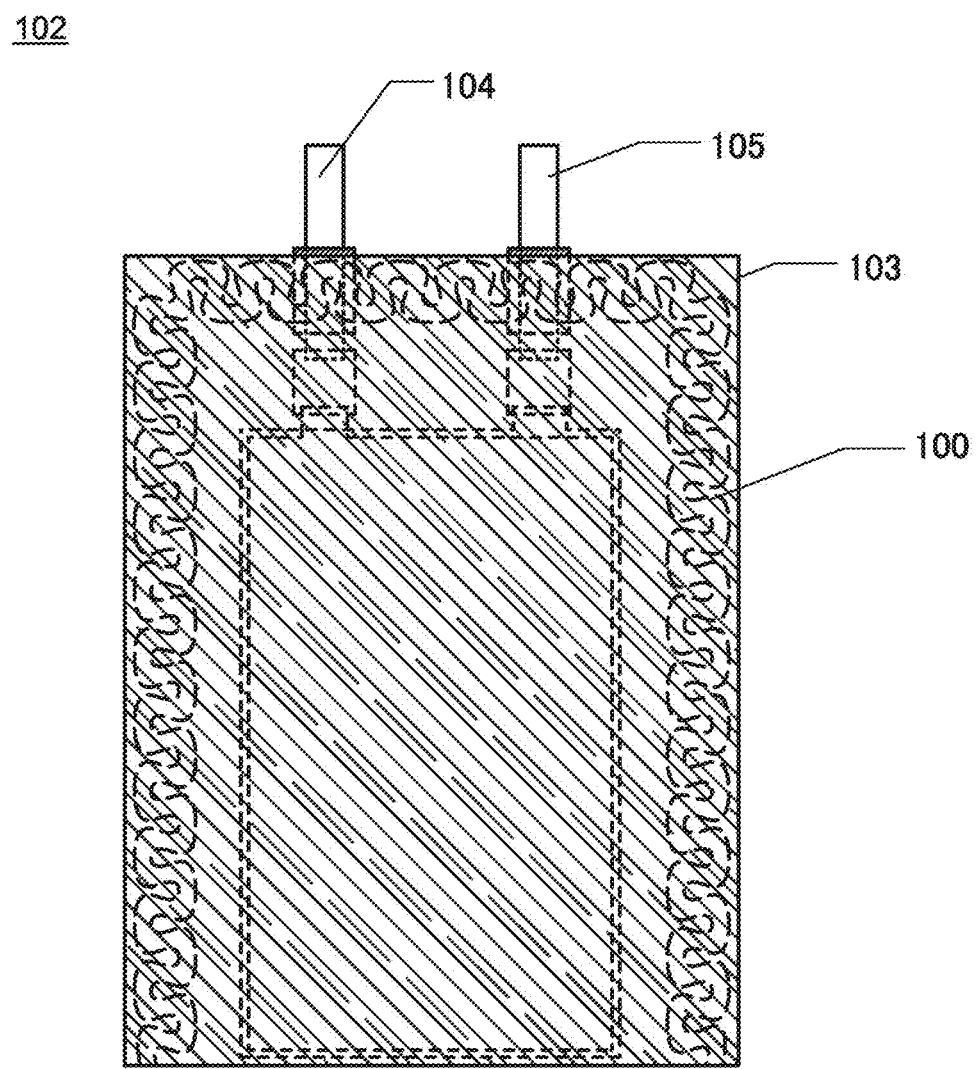
FIG. 8 shows a secondary battery of one embodiment of the present invention.
Figure 19:
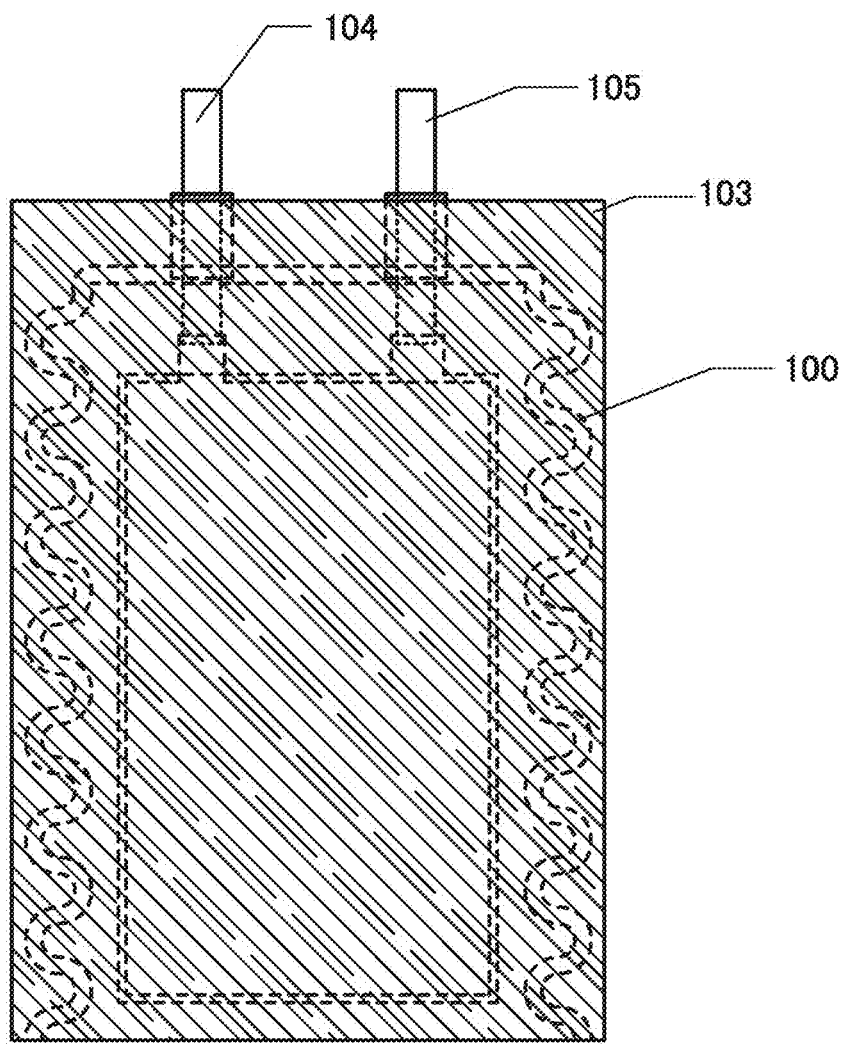
FIG. 19 shows a secondary battery of one embodiment of the present invention.
Figure 20:
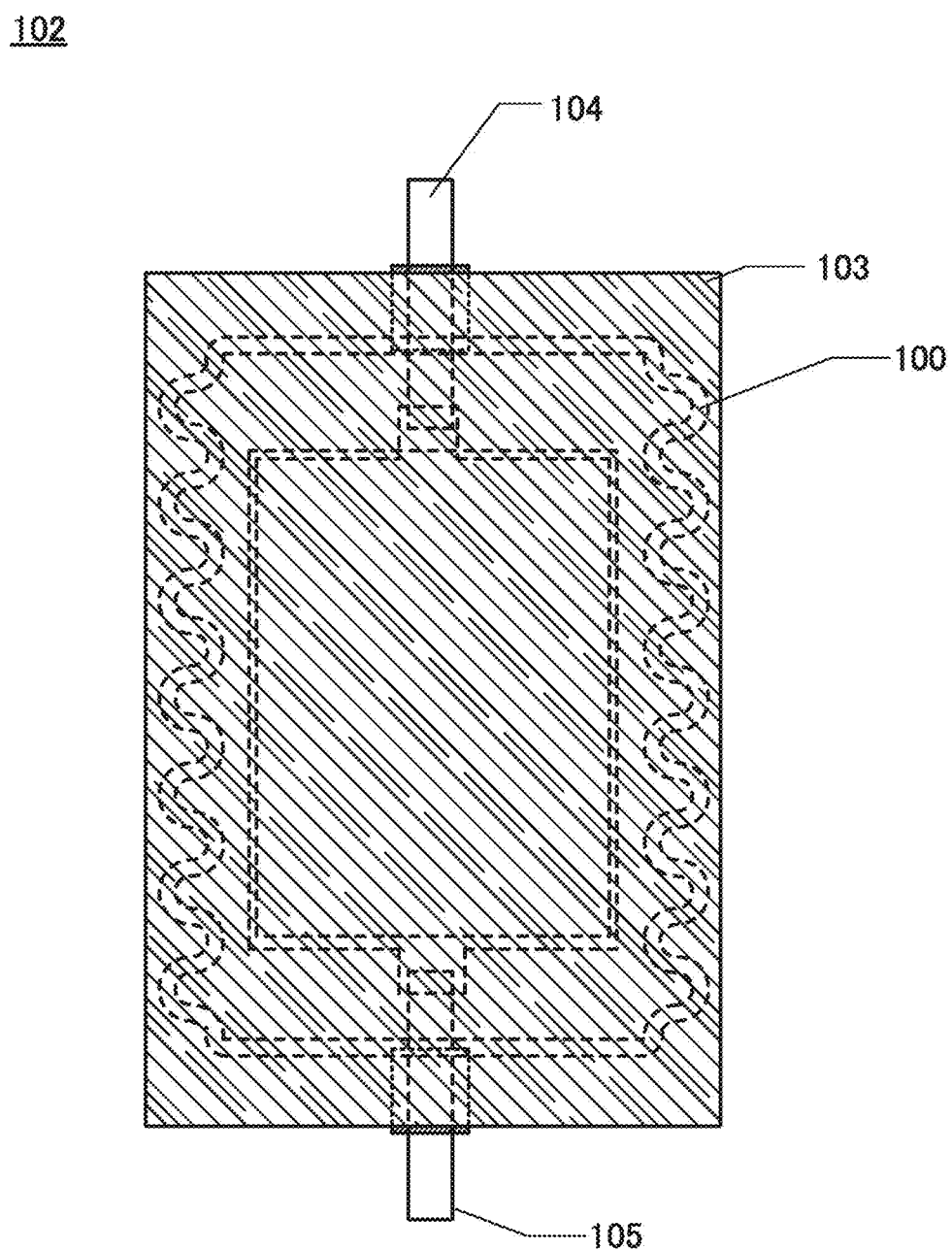
FIG. 20 shows a secondary battery of one embodiment of the present invention.
Figure 21:
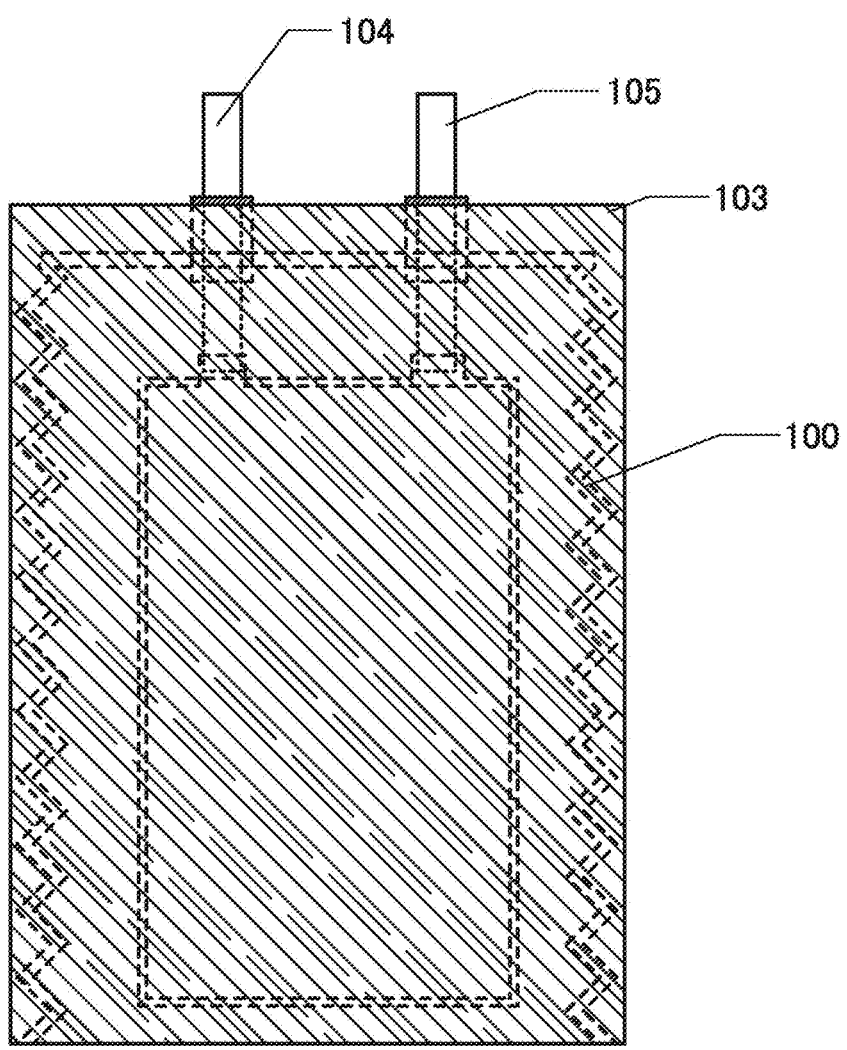
FIG. 21 shows a secondary battery of one embodiment of the present invention.
Figure 22:
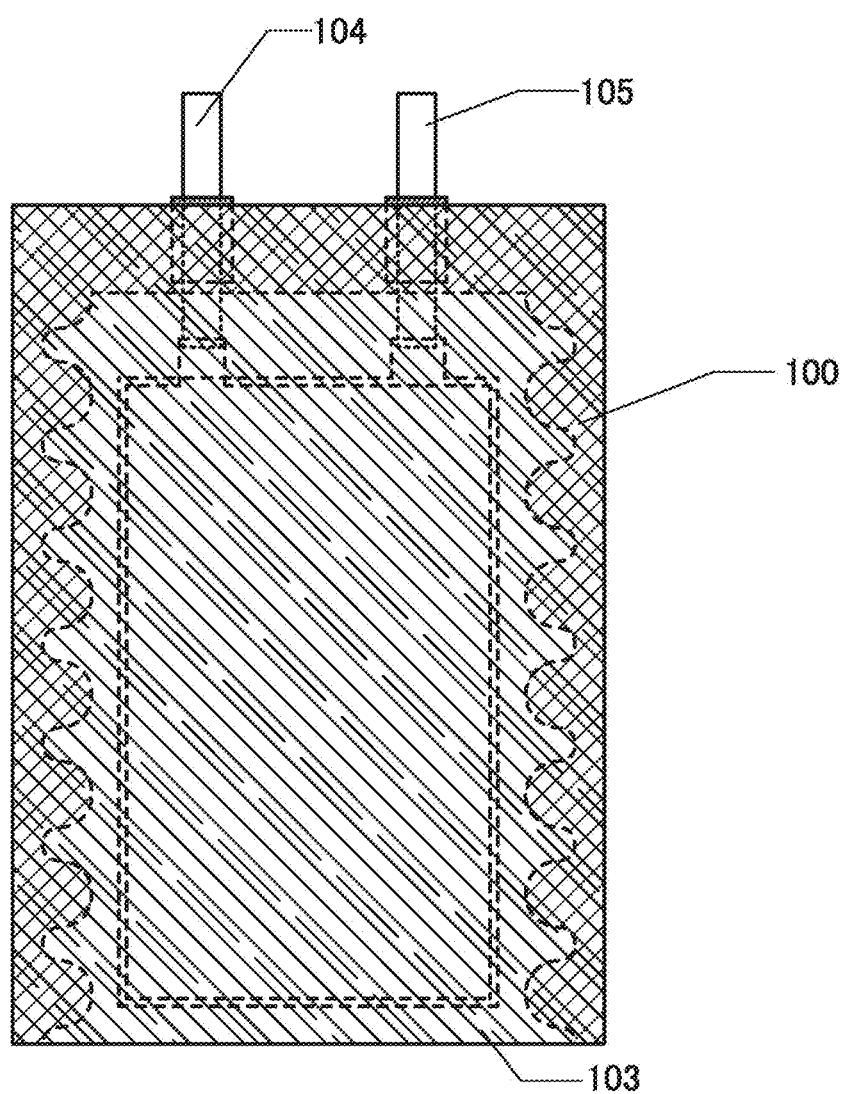
FIG. 22 shows a secondary battery of one embodiment of the present invention.
Figure 23:
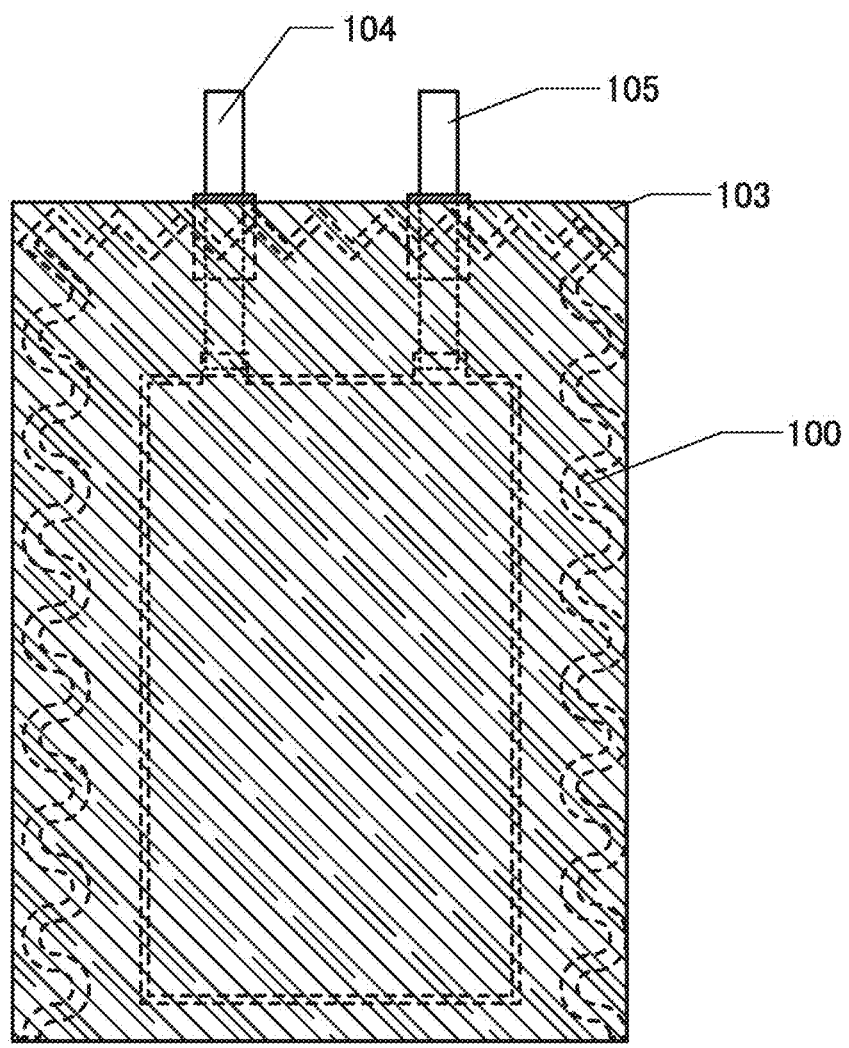
FIG. 23 shows a secondary battery of one embodiment of the present invention.
Figure 24:
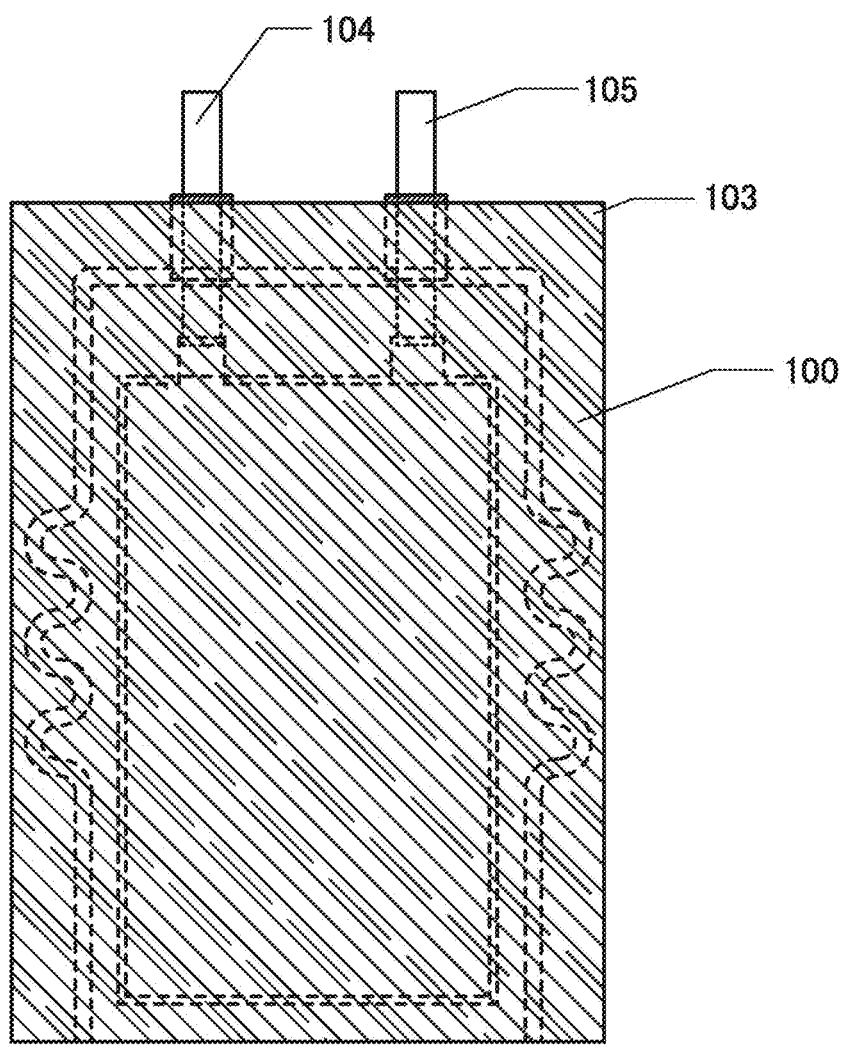
FIG. 24 shows a secondary battery of one embodiment of the present invention.
Figure 25:
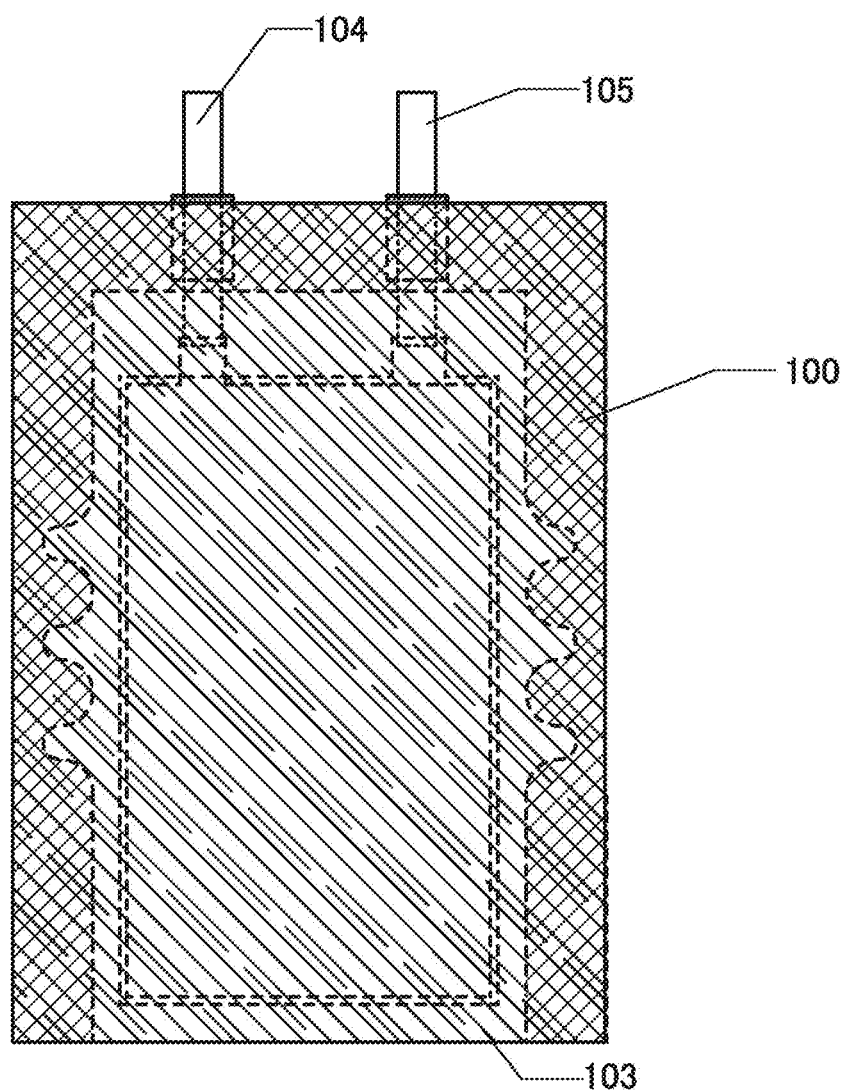
FIG. 25 shows a secondary battery of one embodiment of the present invention.

Although the wavy sealing portion and the shape of the sealing portion at the inner side of the battery with a wavy line are described above, the shape may be a combination of any of the following: a shape with a straight line, a shape with a curve, a shape with a wavy line, a shape with an arch, a shape with a plurality of inflection points, and the like. Furthermore, different shapes may be employed for different sides. Furthermore, a different shape may be employed in a certain region. For example, a case where the upper side sealing portion in FIG. 1A is made linear is shown in FIG. 19. Not only in FIG. 1A but also in the other drawings, some of the sides may be made linear or into other various shapes. For example, a case where such modification is made to FIG. 5 is shown in FIG. 20, a case where such modification is made to FIG. 7 is shown in FIG. 21, and a case where such modification is made to FIG. 18 is shown in FIG. 22. In addition, a case where the upper side sealing portion in FIG. 1A is made zigzag is shown in FIG. 23, as an example. In addition, other examples in which the shape of a sealing portion is changed in some regions are shown in FIGS. 24 and 25.

As described above, in a variety of drawings in this specification, the shape of a sealing portion and the shape of a sealing portion at the inner side of a battery can be changed, at some sides or in some regions, into a variety of different shapes.

An exterior body of a flexible secondary battery of one embodiment of the present invention can be deformed with a radius of curvature of 10 mm or more, preferably with a radius of curvature of 30 mm or more. One or two films are used as the exterior body of the secondary battery.

Although an example of use in a lithium-ion secondary battery is described in this embodiment, one embodiment of the present invention is not limited to this example. Use in a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible. Use in a variety of power storage devices such as a primary battery, a capacitor, and a lithium-ion capacitor is also possible.

This embodiment can be implemented in appropriate combination with any of the other embodiments.

Embodiment 2

In this embodiment, an example of a manufacturing method of a secondary battery will be described with reference to drawings.

[1. Covering Negative Electrode with Separator]

Figure 9A:
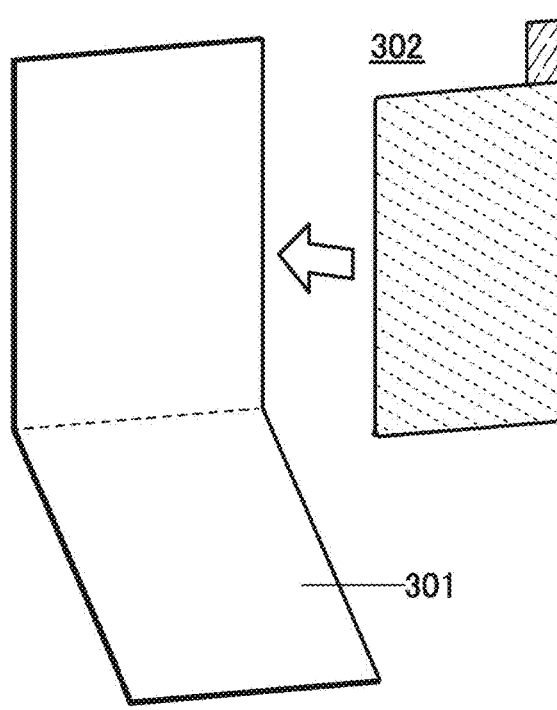
FIGS. 9A to 9D illustrate a manufacturing process of a secondary battery of one embodiment of the present invention.
Figure 9B:
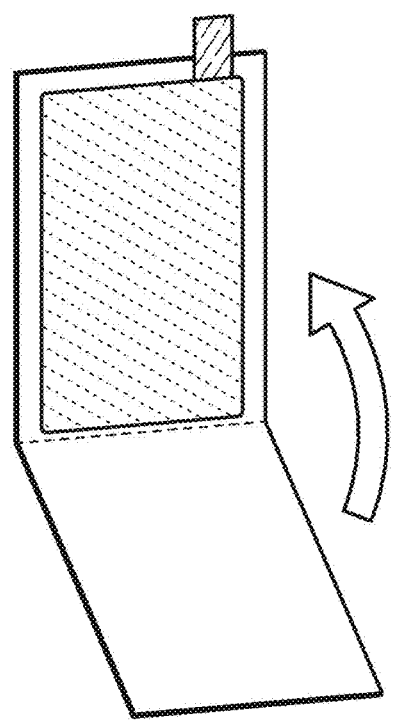
Figure 9C:
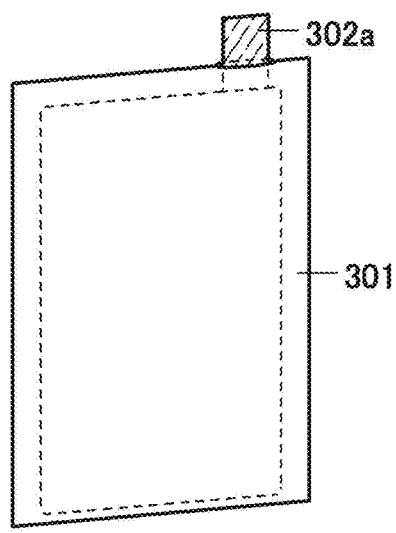

Although the negative electrode described in Embodiment 1 can be used, the negative electrode is not limited thereto. A separator is provided between a positive electrode and a negative electrode in a secondary battery. For example, a method in which a negative electrode is covered with a separator film in a shape of a bag in advance, and a positive electrode and the negative electrode covered with the separator are stored in a secondary battery may be employed. First, a negative electrode 302 is placed on a film 301 for forming a separator (see FIG. 9A). Then, the film 301 is folded along a portion indicated by a dotted line in FIG. 9A (see FIG. 9B), and the negative electrode 302 is interposed between one part of the film 301 and the other part thereof (see FIG. 9C).

Then, the outer edges of the film 301, which is outside of the negative electrode 302, are bonded to form the separator. The outer edges of the film 301 may be bonded to each other using an adhesive or the like or may be bonded by ultrasonic welding or heat fusion bonding.

Figure 9D:
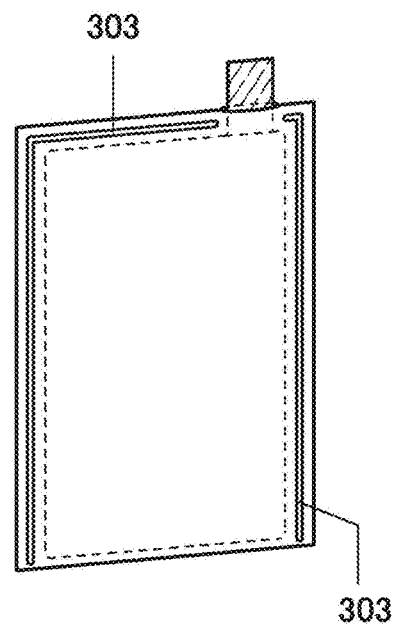

In this embodiment, polypropylene is used as the film 301, and the outer edges of the film 301 are bonded to each other by heating. A bonding portion 303 is shown in FIG. 9D. In this manner, the negative electrode 302 can be covered with the separator.

[2. Connecting Negative Electrode Lead to Negative Electrode Tab]

Figure 10A:
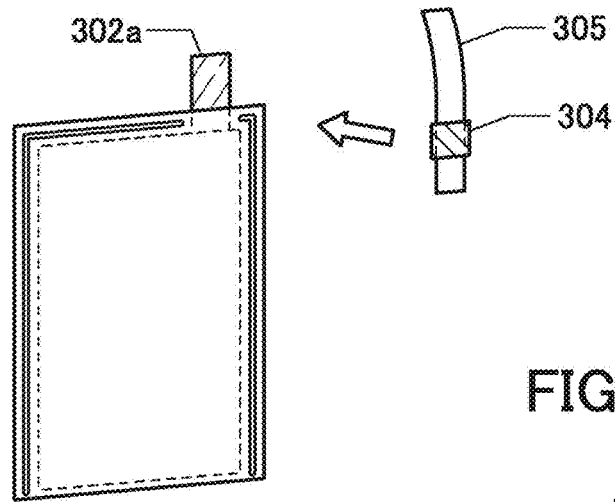
FIGS. 10A to 10D illustrate a manufacturing process of a secondary battery of one embodiment of the present invention.

Next, a negative electrode lead 305 including a sealing layer 304 is electrically connected to the negative electrode tab of the negative electrode current collector 302a by ultrasonic waves with pressure applied (ultrasonic welding) (see FIG. 10A).

The lead electrode is likely to be cracked or cut by a stress due to an external force applied after fabrication of the secondary battery.

Figure 10B:
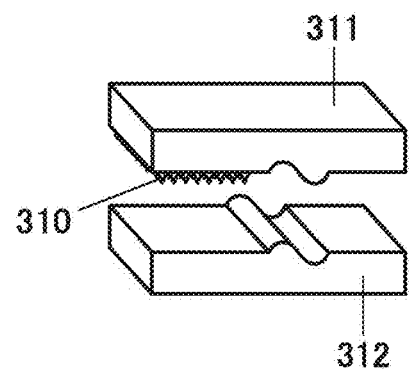
Figure 10D:
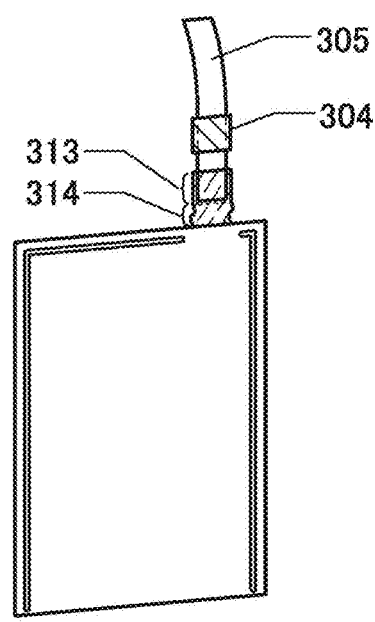

Thus, an ultrasonic welding apparatus including bonding dies illustrated in FIG. 10B is used in this embodiment. Note that only top and bottom bonding dies of the ultrasonic welding apparatus are illustrated in FIG. 10B for simplicity.

Figure 10C:
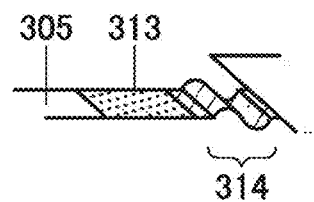

The negative electrode tab and the negative electrode lead 305 are positioned between a first bonding die 311 provided with projections 310 and a second bonding die 312. When ultrasonic welding is performed with a region that is to be connected overlapping with the projections 310, a connection region 313 and a bent portion 314 are formed in the negative electrode tab. FIG. 10C is a perspective view in which the connection region 313 and the bent portion 314 of the negative electrode tab are enlarged.

This bent portion 314 can relax the stress due to an external force applied after fabrication of a secondary battery, whereby the reliability of the secondary battery can be increased.

Furthermore, the ultrasonic welding apparatus including the bonding dies illustrated in FIG. 10B can perform ultrasonic welding and form the bent portion at a time; thus, a secondary battery can be fabricated without increasing the number of fabricating steps. Note that ultrasonic welding and formation of the bent portion 314 may be separately performed.

Figure 11A:
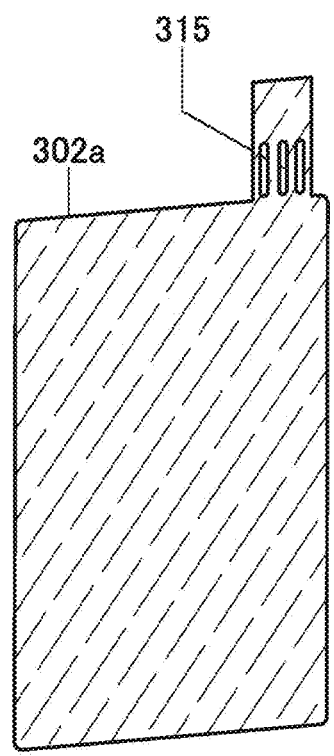
FIGS. 11A and 11B each show a shape of a current collector.
Figure 11B:
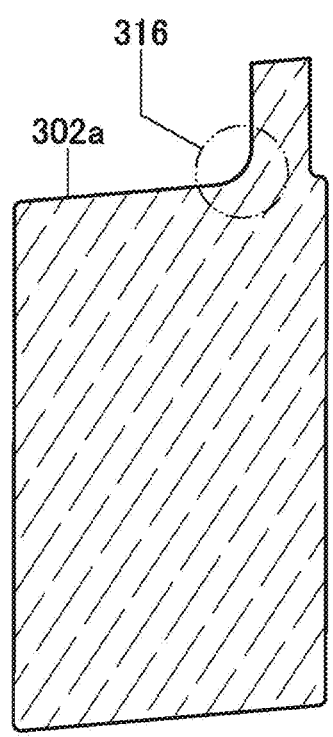

The bent portion 314 is not necessarily formed in the negative electrode tab. To relax stress, the shape of the negative electrode tab of the negative electrode current collector may be modified. FIGS. 11A and 11B each show a perspective view of the negative electrode current collector 302a as an example. For example, a slit 315 may be provided in the negative electrode tab so that a stress generated by an external force applied after fabrication of a secondary battery is relaxed (see FIG. 11A).

Furthermore, the negative electrode current collector 302a may have a rounded corner in a region 316 surrounded by a two-dot chain line in the drawing so that the concentration of a stress is relaxed (see FIG. 11B). Furthermore, the corner of the region 316 is preferably more rounded off than the other corners to have a large radius of curvature.

Alternatively, a high-strength material such as stainless steel may be used for a negative electrode current collector and the negative electrode current collector may be formed to have a thickness of 10 μm or less, in order to relax a stress due to an external force applied after fabrication of a secondary battery.

It is needless to say that two or more of the above examples may be combined to relax concentration of the stress in the negative electrode tab.

[3. Connecting Positive Electrode Lead to Positive Electrode Tab]

Next, the positive electrode lead including a sealing layer is electrically connected to the positive electrode tab of the positive electrode current collector. The connection of the positive electrode lead to the positive electrode tab can be performed in a manner similar to the connection of the negative electrode lead to the negative electrode tab.

[4. Covering Positive Electrode and Negative Electrode with Exterior Body]

Next, a positive electrode 318 and the negative electrode 302 are stacked and placed over an exterior body 317. At this time, the positive electrode 318 and the negative electrode 302 are stacked so that a positive electrode active material layer 318b and a negative electrode active material layer 302b face each other (see FIG. 12A).

Figure 13A:
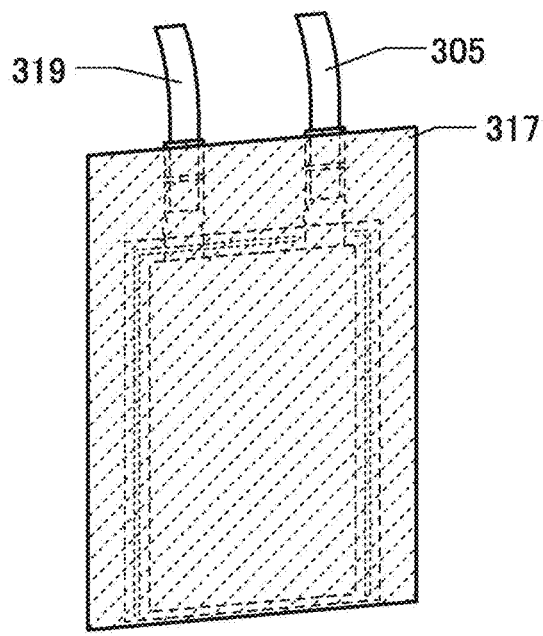
FIGS. 13A to 13C illustrate a manufacturing process of a secondary battery of one embodiment of the present invention.

Then, the exterior body 317 is folded along a portion indicated by the dotted line in the middle of the exterior body 317 shown in FIG. 12A (see FIG. 12B) so as to be in the state shown in FIG. 13A.

[5. Introducing Electrolyte Solution to Exterior Body]

The outer edges of the exterior body 317 except an introduction port 320 for introducing the electrolyte solution are bonded to each other by thermocompression bonding. The shape of a sealing portion 322 formed by thermocompression bonding can be a shape with a wavy line, a shape with an arch, or a shape with a plurality of inflection points described in Embodiment 1. In this way, the boundary between a bonded portion and a non-bonded portion is longer along the sealing portion than the case where the sealing portion has a linear shape. Therefore, when a certain stress is applied due to deformation of the secondary battery, the stress can be dispersed in a larger region and a portion of the exterior body near the sealing portion is less likely to be broken. Accordingly, a sealing portion with such a shape is suitable for the sealing structure of a secondary battery with high durability. In addition, a sealing portion with a total length larger than that of a linear sealing portion can be formed to increase the adhesion, whereby a highly reliable secondary battery that can endure repeated deformation can be obtained.

Figure 13B:
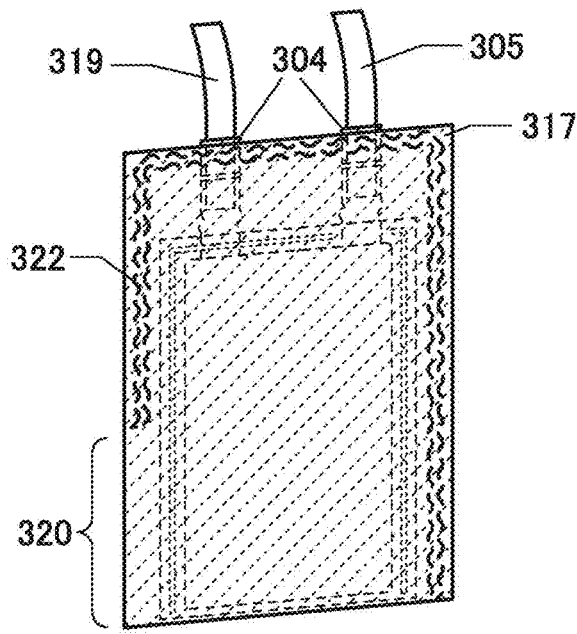

In thermocompression bonding, the sealing layers 304 provided over the lead electrodes are also melted, thereby fixing the lead electrodes and the exterior body 317 to each other. FIG. 13B shows the sealing portion 322 where a first region of the exterior body 317 and a second region of the exterior body 317 having the same shape as the first region are bonded to each other by thermocompression bonding.

Figure 13C:
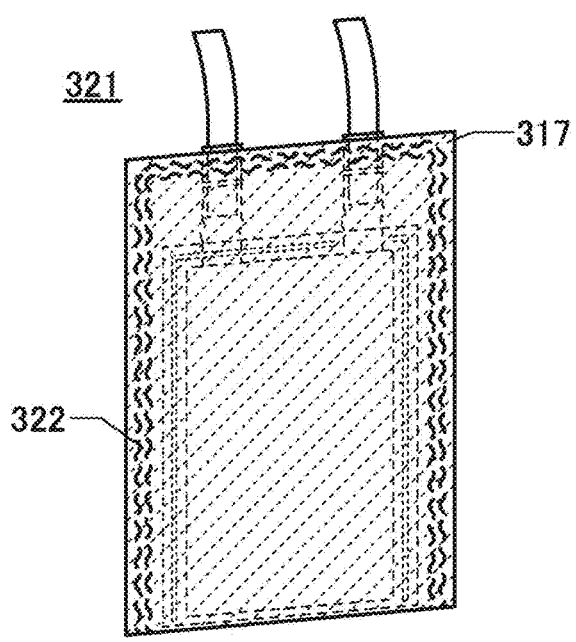

After that, in a reduced-pressure atmosphere or an inert atmosphere, a desired amount of electrolyte solution is introduced to the inside of the exterior body through the introduction port 320. Finally, the introduction port 320 is sealed by thermocompression bonding. Through the above steps, a secondary battery 321 can be fabricated (see FIG. 13C). Note that the planar shape of a portion for sealing the introduction port may be similar to the planar shape of the other sealing portion.

This embodiment can be implemented in appropriate combination with any of the other embodiments.

Embodiment 3

In this embodiment, examples of electronic devices including the secondary battery illustrated in the above embodiments will be described with reference to FIGS. 14A to 14F and FIGS. 15A and 15B.

Examples of electronic devices including secondary batteries are cameras such as digital cameras and digital video cameras, digital photo frames, mobile phones (also referred to as cellular phones or portable telephone devices), portable game consoles, portable information terminals, and audio reproducing devices. Specific examples of these electronic devices are shown in FIGS. 14A to 14F and FIGS. 15A and 15B.

Figure 14A:
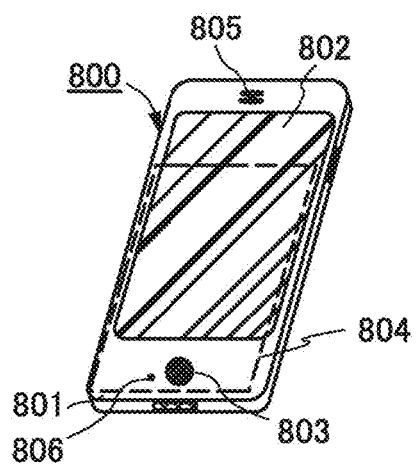
FIGS. 14A to 14F illustrate electronic devices.

FIG. 14A shows an example of a mobile phone. A mobile phone 800 is provided with a display portion 802 incorporated in a housing 801, an operation button 803, a speaker 805, a microphone 806, and the like. The use of a secondary battery 804 of one embodiment of the present invention in the mobile phone 800 results in weight reduction.

When the display portion 802 of the mobile phone 800 shown in FIG. 14A is touched with a finger or the like, data can be input into the mobile phone 800. Users can make a call or text messaging by touching the display portion 802 with their fingers or the like.

There are mainly three screen modes for the display portion 802. The first mode is a display mode mainly for displaying an image. The second mode is an input mode mainly for inputting data such as characters. The third mode is a display-and-input mode in which two triodes of the display mode and the input mode are combined.

For example, when making a call or creating an e-mail, a text input mode mainly for inputting text is selected for the display portion 802 so that input operations of texts displayed on a screen can be performed.

When a sensing device including a sensor such as a gyroscope and an acceleration sensor for detecting inclination is provided in the mobile phone 800, display on the screen of the display portion 802 can be automatically changed in direction by determining the orientation of the mobile phone 800 (whether the mobile phone 800 is placed horizontally or vertically for a landscape mode or a portrait mode).

The screen modes are switched by touching the display portion 802 or operating the operation button 803 of the housing 801. Alternatively, the screen modes may be switched depending on the kind of the image displayed on the display portion 802. For example, when a signal of an image displayed on the display portion is a signal of moving image data, the screen mode is switched to the display mode. When the signal is a signal of text data, the screen mode is switched to the input mode.

Moreover, in the input mode, if a signal detected by an optical sensor in the display portion 802 is detected and the input by touch on the display portion 802 is not performed for a certain period, the screen mode may be controlled so as to be changed from the input mode to the display mode.

The display portion 802 can function as an image sensor. For example, an image of a palm print, a fingerprint, or the like is taken with the display portion 802 touched with the palm or the finger, whereby personal authentication can be performed. Further, when a backlight or a sensing light source which emits near-infrared light is provided in the display portion, an image of a finger vein, a palm vein, or the like can be taken.

Figure 14B:
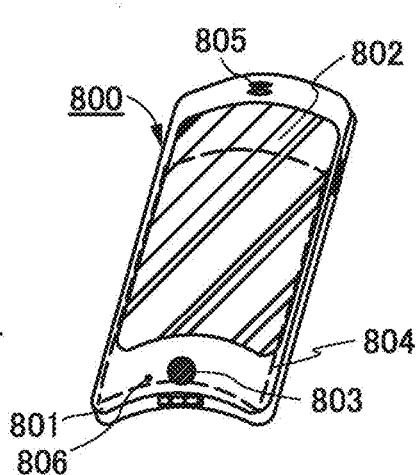
Figure 14C:
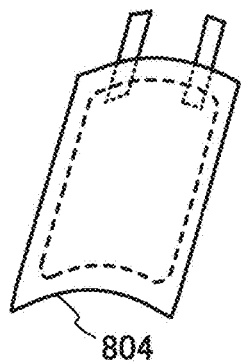

FIG. 14B shows the mobile phone 800 that is bent. When the whole mobile phone 800 is bent by the external force, the secondary battery 804 included in the mobile phone 800 is also bent. FIG. 14C shows the bent secondary battery 804. The secondary battery 804 is a secondary battery with a layered structure.

Figure 15A:
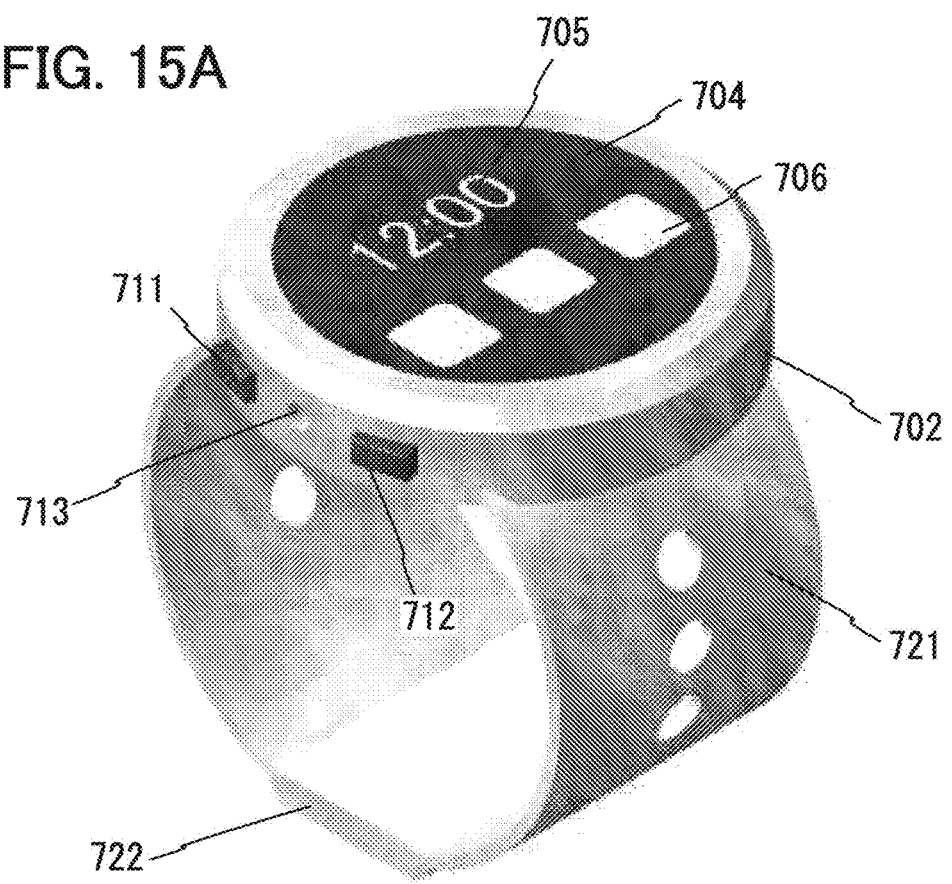
FIGS. 15A and 15B illustrate an electronic device.

FIG. 15A shows a smart watch. The smart watch can include a housing 702, a display panel 704, operation buttons 711 and 712, a connection terminal 713, a band 721, a clasp 722, and so on. The use of the secondary battery of one embodiment of the present invention in the smart watch results in weight reduction. The secondary battery of one embodiment of the present invention, described in Embodiment 1 or 2, may be provided in the housing 702. As the secondary battery, a flexible secondary battery 740 of one embodiment of the present invention may be provided in the band 721. The flexible secondary battery 740 may have a band-like shape and be attachable to and detachable from the housing 702. Electric power can be supplied to the housing 702 through a positive electrode terminal 741 and a negative electrode terminal 742 (see FIG. 15B).

The display panel 704 mounted in the housing 702 serving as a bezel includes a non-rectangular display region. The display panel 704 can display an icon 705 indicating time, another icon 706, and the like.

Figure 15B:
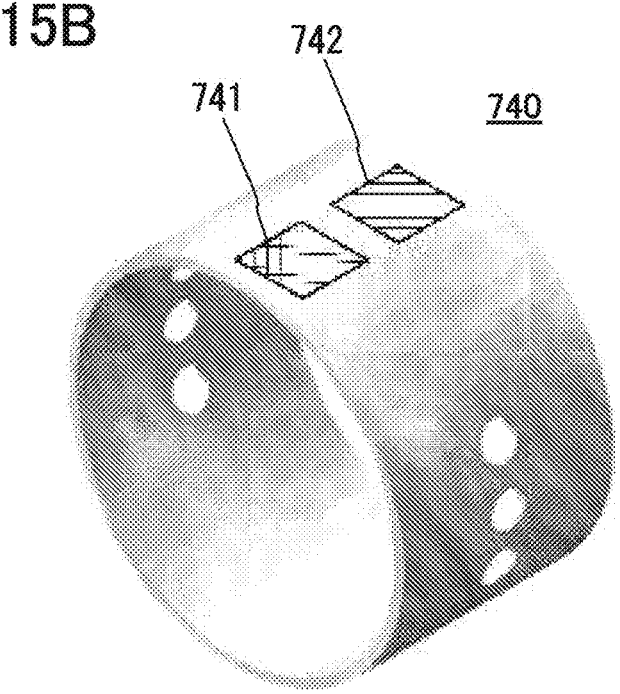
Figure 16A:
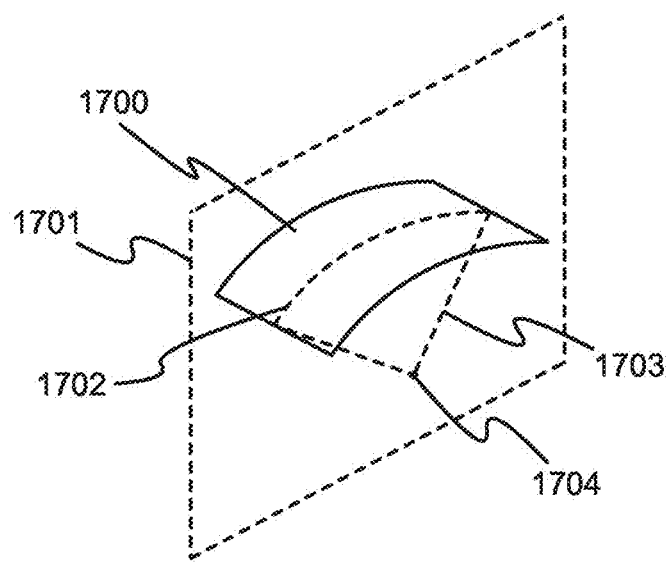
FIGS. 16A to 16C illustrate the radius of curvature.
Figure 16B:
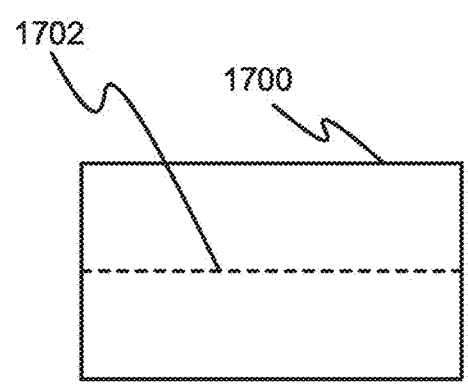
Figure 16C:
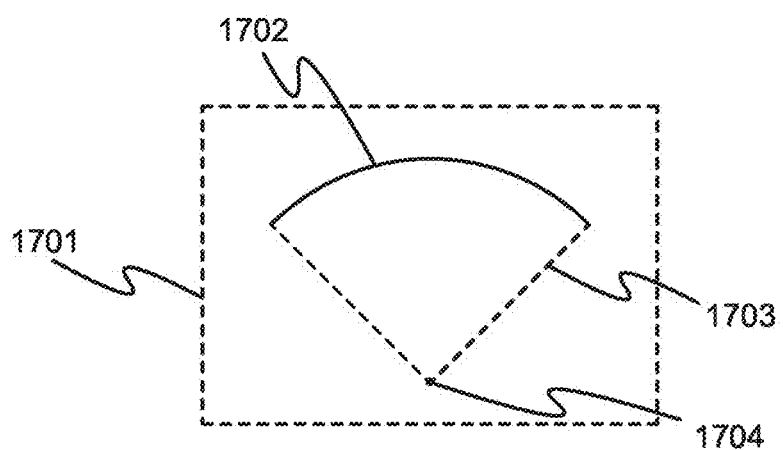
Figure 17A:
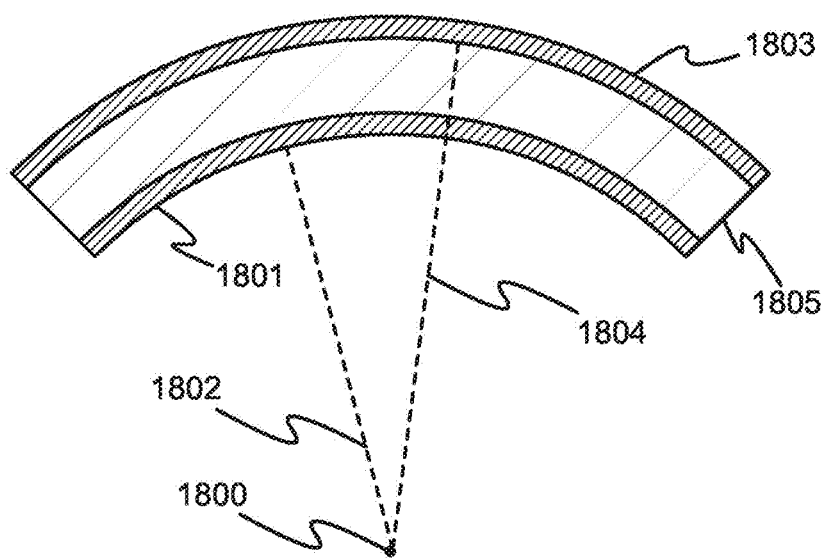
FIGS. 17A to 17D illustrate a flexible secondary battery.
Figure 17B:
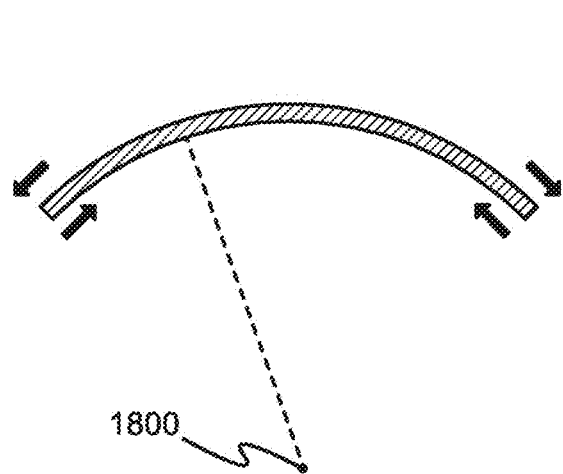
Figure 17C:
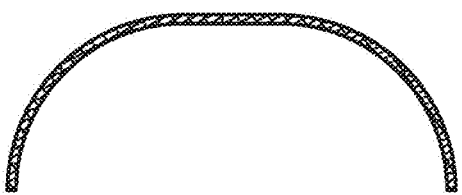
Figure 17D:
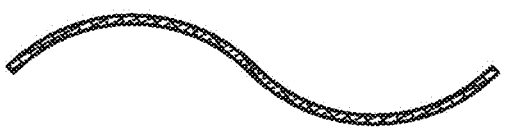

The smart watch in FIGS. 15A and 15B can have a variety of functions, for example, a function of displaying a variety of information (e.g., a still image, a moving image, and a text image) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading program or data stored in a recording medium and displaying the program or data on a display portion.

The housing 702 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like.

Figure 14D:
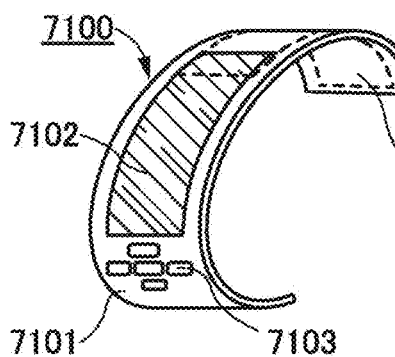
Figure 14E:

FIG. 14D shows an example of a bangle display device. A portable display device 7100 includes a housing 7101, a display portion 7102, an operation button 7103, and a secondary battery 7104. FIG. 14E illustrates the bent secondary battery 7104.

Figure 14F:
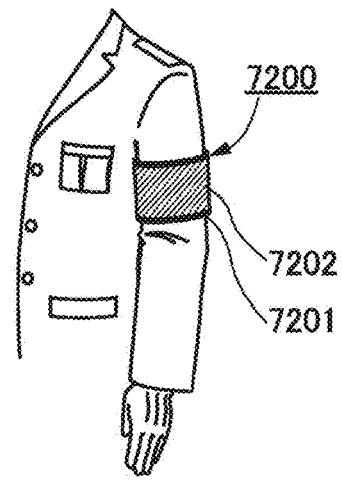

FIG. 14F shows an example of an armband display device. An armband display device 7200 includes a housing 7201 and a display portion 7202. Although not shown, a flexible secondary battery is included in the armband display device 7200. The flexible secondary battery changes in shape in accordance with change in the shape of the armband display device 7200.

Note that the structure and the like described in this embodiment can be used as appropriate in combination with any of the structures and the like in the other embodiments.

This application is based on Japanese Patent Application serial no. 2013-251175 filed with Japan Patent Office on Dec. 4, 2013, the entire contents of which are hereby incorporated by reference.

What is claimed is:

1. A power storage device comprising:
    a positive electrode;
    a negative electrode;
    an electrolyte; and
    an exterior body that encloses the positive electrode, the negative electrode, and the electrolyte,
    wherein the positive electrode and the negative electrode are stacked in a cross-sectional view,
    wherein the exterior body comprising a first sheet-like region, a second sheet-like region and a sealing portion bonding the first sheet-like region and the second sheet-like region, wherein the sealing portion encloses a space including the positive electrode, the negative electrode, and the electrolyte in a planar view, wherein the sealing portion has a shape comprising a first arc interposed between a second arc and a third arc in the planar view, wherein in the planar view, the first arc is inwardly protruding toward the space enclosed by the sealing portion, wherein in the planar view, each of the second arc and the third arc is outwardly protruding toward the space enclosed by the sealing portion, and wherein directions of the cross-sectional view and the planar view are perpendicular to each other.

2. The power storage device according to claim 1, wherein the sealing portion has four sides, and
wherein one of the four sides comprises the first arc, the second arc and the third arc.

3. The power storage device according to claim 1, wherein the sealing portion has four sides, and
wherein one of the four sides is a part of a film comprising the first sheet-like region and the second sheet-like region.

4. The power storage device according to claim 1, wherein the shape of the sealing portion in the planar view further comprises a fourth arc interposed between a fifth arc and a sixth arc,
wherein in the planar view, the fourth arc is inwardly protruding toward the space enclosed by the sealing portion,
wherein in the planar view, each of the fifth arc and the sixth arc is outwardly protruding toward the space enclosed by the sealing portion,
wherein the sealing portion has four sides,
wherein the four sides comprises a first side and a second side which face each other,
wherein the first side comprises the first arc, the second arc and the third arc, and
wherein the second side comprises the fourth arc, the fifth arc and the sixth arc.

5. The power storage device according to claim 1, wherein the power storage device is flexible.

6. The power storage device according to claim 1, wherein the electrolyte comprises a gelled high-molecular material.

7. The power storage device according to claim 1, wherein the positive electrode and the negative electrode are stacked in the cross-sectional view.

8. An electronic device comprising the power storage device according to claim 1.

9. A power storage device comprising:
a positive electrode;
a negative electrode;
an electrolyte; and
an exterior body encloses a space including the positive electrode, the negative electrode, and the electrolyte,
wherein the positive electrode and the negative electrode are stacked in a cross-sectional view, wherein the exterior body comprising a first sheet-like region, a second sheet-like region and a sealing portion bonding the first sheet-like region and the second sheet-like region, wherein a film comprises the first sheet-like region, the second sheet-like region and a first part, wherein the space including the positive electrode, the negative electrode, and the electrolyte is surrounded by the sealing portion and the first part of the film in a planar view, wherein the sealing portion has a shape comprising a first arc interposed between a second arc and a third arc in the planar view, wherein in the planar view, the first arc is inwardly protruding toward the space enclosed by the sealing portion, wherein in the planar view, each of the second arc and the third arc is outwardly protruding toward the space enclosed by the sealing portion, and wherein directions of the cross-sectional view and the planar view are perpendicular to each other.

10. The power storage device according to claim 9, wherein the sealing portion has two or three sides comprising a first side, and
wherein the first side comprises the first arc, the second arc and the third arc in the planar view.

11. The power storage device according to claim 10, wherein the first side does not have a straight line.

12. The power storage device according to claim 9, wherein the shape of the sealing portion further comprises a fourth arc interposed between a fifth arc and a sixth arc in the planar view,
wherein in the planar view, the fourth arc is inwardly protruding toward the space enclosed by the sealing portion,
wherein in the planar view, each of the fifth arc and the sixth arc is outwardly protruding toward the space enclosed by the sealing portion,
wherein the sealing portion has two or three sides,
wherein the two or three sides comprises a first side and a second side which face each other,
wherein the first side comprises the first arc, the second arc and the third arc in the planar view, and
wherein the second side comprises the fourth arc, the fifth arc and the sixth arc in the planar view.

13. The power storage device according to claim 9, wherein the power storage device is flexible.

14. The power storage device according to claim 9, wherein the electrolyte comprises a gelled high-molecular material.

15. The power storage device according to claim 9, wherein the positive electrode and the negative electrode are stacked in the cross-sectional view.

16. An electronic device comprising the power storage device according to claim 9.

* * * * *